United States Patent
Nishikawa et al.

(10) Patent No.: US 11,326,557 B2
(45) Date of Patent: May 10, 2022

(54) 2-PULSE GAS GENERATOR AND METHOD OF MEASURING PROPELLANT COMBUSTION SURFACE POSITION

(71) Applicant: MITSUBISHI HEAVY INDUSTRIES, LTD., Tokyo (JP)

(72) Inventors: Seiki Nishikawa, Tokyo (JP); Chiyako Mihara, Tokyo (JP); Tasuku Suzuki, Tokyo (JP); Katsunori Ieki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 752 days.

(21) Appl. No.: 16/204,151

(22) Filed: Nov. 29, 2018

(65) Prior Publication Data

US 2020/0025152 A1    Jan. 23, 2020

(30) Foreign Application Priority Data

Mar. 30, 2018  (JP) .............................. JP2018-068085

(51) Int. Cl.
*F02K 9/95* (2006.01)
*F02K 9/12* (2006.01)
(Continued)

(52) U.S. Cl.
CPC .................. *F02K 9/95* (2013.01); *F02K 9/12* (2013.01); *F02K 9/18* (2013.01); *F02K 9/20* (2013.01); *F02K 9/28* (2013.01)

(58) Field of Classification Search
CPC ..... F02K 9/12; F02K 9/26; F02K 9/30; F02K 9/08; F02K 9/763; F02K 9/80; F41G 7/00; F24B 10/00; B64G 1/244; B64G 2001/245
See application file for complete search history.

(56) References Cited

U.S. PATENT DOCUMENTS 4,979,697 A * 12/1990 Kranz ....................... F02K 9/92
                                                            244/3.22
5,099,218 A *  3/1992 Salisbury ............. H01H 85/055
                                                            337/160
(Continued)

FOREIGN PATENT DOCUMENTS

JP        61-122512      6/1986
JP        61-122524      6/1986
(Continued)

OTHER PUBLICATIONS

NASA "General Thrust Equation" (Year: 2016).*
(Continued)

*Primary Examiner* — Arun Goyal
*Assistant Examiner* — William L Breazeal
(74) *Attorney, Agent, or Firm* — Wenderoth, Lind & Ponack, L.L.P.

(57) ABSTRACT

The first solid propellant is formed to have a columnar shape so as for a combustion surface to move to a first direction, and to have an end surface exposed to a combustion space. The surface of first solid propellant except for the end surface is covered with a barrier membrane. The position of combustion surface in the first direction is detected by a position sensor device in an always-on measurement or a fixed-point measurement. Based on the detected result, the consumption amount of the first solid propellant is estimated.

20 Claims, 23 Drawing Sheets

(51) Int. Cl.
  *F02K 9/28*  (2006.01)
  *F02K 9/20*  (2006.01)
  *F02K 9/18*  (2006.01)

(56) References Cited

U.S. PATENT DOCUMENTS

| | | | | |
|---|---|---|---|---|
| 5,107,129 | A | * | 4/1992 | Lombrozo ............... F02K 9/26 250/227.11 |
| 6,412,275 | B1 | * | 7/2002 | Perrucci .................... F02K 9/80 60/204 |
| 2016/0115905 | A1 | * | 4/2016 | Suzuki ...................... F02K 9/12 60/204 |

FOREIGN PATENT DOCUMENTS

| JP | 2004-225678 | 8/2004 |
|---|---|---|
| JP | 2010-236245 | 10/2010 |
| JP | 2010-236425 | 10/2010 |
| JP | 2014-016187 | 1/2014 |
| JP | 2016-084744 | 5/2016 |
| JP | 5984208 | 9/2016 |

OTHER PUBLICATIONS

Sung-Jin Song et al., "Measurement of Solid Propellant Burning Rates by Analysis of Ultrasonic Full Waveforms", Journal of Mechanical Science and Technology 23 (2009), pp. 1112-1117.

H. Kurabayashi et al., "Ultrasonic Measurements of Burning Rates in Full-Size Rocket Motors", Progress in Propulsion Physics 2 (2011), pp. 135-148.

Notice of Reasons for Refusal dated Jul. 28, 2021 in corresponding Japanese Patent Application No. 2018-068085, with Machine Translation, 6 pages.

\* cited by examiner

2-PULSE GAS GENERATOR AND METHOD OF MEASURING PROPELLANT COMBUSTION SURFACE POSITION

TECHNICAL FIELD

The present invention relates to a 2-pulse gas generator and a method of measuring a propellant combustion surface position.

BACKGROUND ART

In the operation of missiles, there is a case where a method of re-accelerating a missile by using a rocket motor of a multi-pulse configuration and a method of carrying out the orbit correction of the missile by a thruster are required at a same time, for the purpose of securing the high mobility for terminal guidance at the time of approaching a target.

In this case, the thruster includes nozzles each having a combustion gas exhaust hole and an actuator to supply the combustion gas to the nozzle or block the supply of the combustion gas. In the thruster, the plurality of nozzles are arranged in optional directions, and the orbit correction and attitude control of the missile are carried out by ejecting the combustion gas in optional flow rates from optional nozzles. As configurations to install the thruster to the missile, it would be possible to install the thruster to the combustion gas generator called a gas generator and to install the thruster directly to the rocket motor (here, temporarily, the former is called a thruster separation type, and the latter is called a thruster non-separation type).

In the operation of missile loaded with the thruster, there is a case where not a previously set operation pattern of thruster but an operation pattern of thruster to be optionally settable according to the situation of the target is required. To allow such an operation, the consumption amount of propellant in the gas generator and an opening area of each thruster must be correctly grasped.

In relation to the above, Patent Literature 1 (JP S61-122512A) discloses a method of measuring a residual amount of propellant in a spacecraft. In this measuring method, a supersonic probe is installed on the surface of a propellant tank loaded on the spacecraft, the thickness of propellant in the propellant tank is measured by the supersonic probe, and the volume of propellant is determined based on the measured thickness to measure the propellant residual amount.

Also, Patent Literature 2 (JP S61-122524A) discloses a method of measuring a residual amount of propellant in a spacecraft. In the measuring method, at least one electric heater and a temperature detector are installed on an external surface of a propellant tank loaded in the spacecraft, the propellant is heated with the electric heater when measuring the propellant residual amount in the propellant tank, a propellant temperature rise is detected with the temperature detector so as to determine a thermal capacity change which accompanies the decrease of the propellant, and the propellant residual amount is estimated from the thermal capacity change.

Also, Patent Literature 3 (JP 2010-236425A) discloses a burning rate measuring apparatus. In the burning rate measuring apparatus, a burning rate is measured from combustion light generated by the combustion of solid propellant. This burning rate measuring apparatus includes the solid propellant, a light guiding member, a photo-detector element and a voltage measuring unit. The light guiding member is provided on the side of the end surface of the non-combustion solid propellant, and transmits transmission light to a direction orthogonal to the combustion surface. The photo-detector element measures an amount of the light received through the light guiding member. The voltage measuring unit converts light amount data obtained from the photo-detector element into an electric signal.

Also, Patent Literature 4 (JP 2014-016187A) discloses a method of measuring of a decrease amount of combustion material. In the method of measuring of a decrease amount of combustion material, the thickness of combustion material decreased through the combustion of material arranged in a case is measured. A supersonic transmitter probe and a supersonic receiver probe are arranged on the external surface of case. The supersonic wave is transmitted from the supersonic transmitter probe for the combustion surface of the combustion material, and a reflection echo reflected on the combustion surface, a supersonic echo propagating along the external surface of case, and a reflection echo reflected in a configuration material are received by the supersonic receiver probe, and each propagation time differences of three echoes received by the supersonic receiver probe are determined and displayed on a B scope. Thus, the change of the reflection echo reflected on the combustion surface is made clear. At this time, difference calculation processing $N=n-(n-i)$ is carried out to the waveform n of the reflection echo received by the receiving end probe based on the waveform $(n-i)$ of the reflection echo received by the supersonic receiver probe before i echoes. Then, amplification processing is carried out to a differential waveform (N).

Also, Patent Literature 5 (JP 2016-084744A) discloses a gas generator. This gas generator includes a pressure vessel, an outer propellant, an inner propellant and a barrier membrane. The outer propellant is arranged in the pressure vessel and is cylindrical. The inner propellant is arranged inside the outer propellant, and is columnar. The barrier membrane isolates the outer propellant and the inner propellant. The inner propellant has a front end surface and a side surface, and the front end surface facing a combustion space in the pressure vessel. The side surface of the inner propellant is isolated from the combustion space.

Also, Patent Literature 6 (Japanese Patent No. 5,984,208) discloses a method of measuring of a decrease amount of combustion material. In the method of measuring of a decrease amount of combustion material, the thickness decreased through the combustion of the combustion material arranged in a case is measured. A supersonic transmitter probe and a supersonic receiver probe are arranged on the external surface of case. The supersonic wave is transmitted from the supersonic transmitter probe for the combustion surface of the combustion material, and a reflection echo reflected on the combustion surface, a supersonic echo propagating along the external surface of case, and a reflection echo reflected in a configuration material are received by the supersonic receiver probe, and each propagation time differences of three echoes received by the supersonic receiver probe are determined and displayed on a B scope. Thus, the change of the reflection echo reflected on the combustion surface is made clear. At this time, difference calculation processing $N=n-(n-i)$ is carried out to the waveform n of the reflection echo received by the receiving probe based on the waveform $(n-i)$ of the reflection echo received by the supersonic receiver probe before i echoes. Then, amplification processing is carried out to a differential waveform (N).

Also, Non-Patent Literature 1 (Measurement of solid propellant burning rates by analysis of ultrasonic full waveforms) discloses a supersonic burning rate measurement system. This supersonic burning rate measurement system measures full waveforms and pressure of the supersonic wave generated at the time of combustion of solid fuel to determine a burning rate. This supersonic burning rate measurement system includes a sealed container, a supersonic signal acquisition system, a pressure data acquisition system and a control computer. Here, the sealed container is possible to pressurize by about 4,000-pound per square inch. The supersonic signal acquisition system includes a general beam supersonic wave converter, a supersonic pulser/receiver, and a high speed analog digital conversion board. The pressure data acquisition system includes a pressure gage, a charge amplifier and an analog digital conversion board. The control computer analyzes the full waveforms and the pressure data of the supersonic wave and makes the burning rate readable as the function of pressure.

Also, Non-Patent Literature 2 (ULTRASONIC MEASUREMENTS OF BURNING RATES IN FULL-SIZE ROCKET MOTORS) discloses a supersonic measurement system. This supersonic measurement system measures a thickness of solid fuel at the time of the combustion by using the supersonic wave. In this supersonic measurement system, the transmitter and receiver for the supersonic wave and two receivers are arranged on the surface of a rocket motor case along the longitudinal direction or the rotation axis. The supersonic wave is transmitted during the combustion of the rocket motor and the supersonic wave reflected on the combustion surface is received.

CITATION LIST

Patent Literature

[Patent Literature 1] JP 561-122512A
[Patent Literature 2] JP 561-122524A
[Patent Literature 3] JP 2010-236425A
[Patent Literature 4] JP 2014-016187A
[Patent Literature 5] JP 2016-084744A
[Patent Literature 6] Japanese Patent No. 5,984,208

Non-Patent Literature

[Non-Patent Literature 1] Sung-Jin Song, Hak-Joon Kim, Sun-Feel Ko, Hyun-Teak Oh, In-Chul Kim, Ji-Chang Yoo, and Jung Yong Jung, "Measurement of solid propellant burning rates by analysis of ultrasonic full waveforms", Journal of Mechanical Science and Technology 23, 2009, pages 1112-1117

[Non-Patent Literature 2] H. Kurabayashi, A. Sato, K. Yamashita, H. Nakayama, K. Hori, M. Honda, and K. Hasegawa, "ULTRASONIC MEASUREMENTS OF BURNING RATES IN FULL-SIZE ROCKET MOTORS", Progress in Propulsion Physics 2, 2011, pages 135-148

SUMMARY OF THE INVENTION

A consumption amount of propellant is estimated in a higher precision.

Other problems and new features will become clear from the description of this Specification and the attached drawings.

According to the embodiment, a 2-pulse gas generator includes a pressure vessel, a first solid propellant, a first igniter, a barrier membrane, a position sensor device and a processing device. Here, the pressure vessel contains a combustion space inside the pressure vessel. The first solid propellant is arranged inside the pressure vessel and a first end surface is exposed to the combustion space. The first igniter is provided to ignite the first end surface of the first solid propellant. The barrier membrane is provided to cover a surface of the first solid propellant other than a combustion surface such that the combustion surface of the first solid propellant moves to a predetermined first direction as the combustion of the first solid propellant advances. The position sensor device is configured to detect the position of combustion surface in the first direction. The processing device is configured to estimate a consumption amount of the first solid propellant based on the detection result of the position of combustion surface.

According to the embodiment, a method of measuring a propellant combustion surface position includes:

arranging inside a pressure vessel, a first solid propellant, a surface of which other than a combustion surface is covered with a barrier membrane such that the combustion surface moves to a predetermined first direction as the combustion of the first solid propellant advances;

igniting the first solid propellant by a first igniter;

detecting a position of combustion surface in the first direction by a position sensor device; and estimating a consumption amount of the first solid propellant based on a detection result of the position of combustion surface by a processing device.

According to the embodiments, the consumption amount of propellant can be estimated in a higher precision.

DESCRIPTION OF EMBODIMENTS

Referring to the attachment drawings, a 2-pulse gas generator and a method of measuring a propellant combustion surface position according to embodiments of the present invention will be described below.

First, to understand the present invention better, a configuration example and operation example of the 2-pulse gas generator as a precondition will be described with reference to FIG. 1A to FIG. 1D and FIG. 2A to FIG. 2B.

Figure 1A:
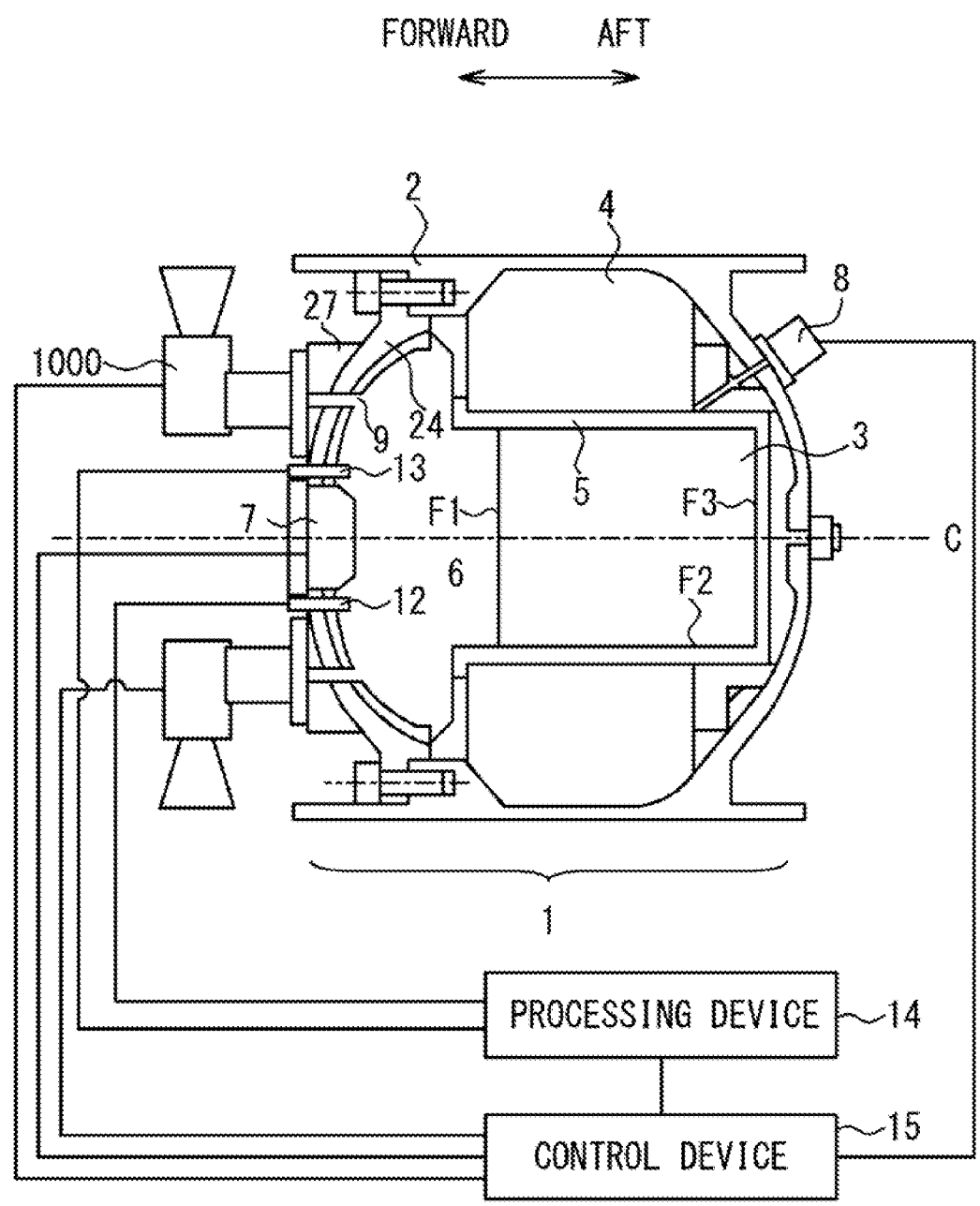
FIG. 1A is a partial cross-sectional view showing a configuration example in a first state of a 2-pulse gas generator according to an embodiment.

FIG. 1A is a partial cross-sectional view showing a configuration example in a first state corresponding to a step before ignition of the 2-pulse gas generator 1 according to an embodiment.

Components of the 2-pulse gas generator 1 shown in FIG. 1A will be described. The 2-pulse gas 35 generator 1 includes a pressure vessel 2, a first solid propellant 3, a second solid propellant 4, a barrier membrane 5 and a combustion space 6. Moreover, it is desired that the 2-pulse gas generator 1 includes a processing device 14 and a control device 15. However, the processing device 14 and the control device 15 may be arranged outside the pressure vessel 2 which is a main unit of the 2-pulse gas generator 1. In other words, the processing device 14 and the control device 15 may be prepared as components different from the 2-pulse gas generator 1.

The pressure vessel 2 includes a main section and a lid section 24 detachable from the main section. The lid section 24 includes a first igniter 7. The main section includes a second igniter 8.

The lid section 24 includes thruster sections 1000. The lid section 24 includes a combustion gas exhaust hole 9 so as for a combustion gas 10 to be mentioned later to reach the thruster section 1000 from a combustion space 6. Moreover, the lid section 24 includes a pressure sensor device 12. Moreover, the lid section 24 may include a position sensor device 13. However, the position sensor device 13 may be arranged in the main section of the 2-pulse gas generator 1 not the lid section 24.

The shape of first solid propellant 3 is columnar. For example, here, a circular column shape is contained in the columnar shape. The first solid propellant 3 shown in FIG. 1A has the circular column shape, and has a first end surface F1, a side surface F2 and a second end surface F3. However, this shape of the first solid propellant 3 is only an example, and may not be a perfect circular column shape, as mentioned later.

The second solid propellant 4 has a cylindrical shape. For example, a circular cylinder shape is contained in the cylindrical shape. In a configuration example of FIG. 1A, the second solid propellant 4 has almost the circular cylindrical shape, and an outer surface has a complementary shape to the inner surface of the pressure vessel 2. However, the above shape of the second solid propellant 4 is only an example and may have a different shape.

A position relation of components in the 2-pulse gas generator 1 shown in FIG. 1A will be described. The first solid propellant 3, the second solid propellant 4, the barrier membrane 5 and the combustion space 6 are arranged inside the pressure vessel 2. The first solid propellant 3 is arranged inside the second solid propellant 4. The barrier membrane 5 is arranged between the first solid propellant 3 and the second solid propellant 4. The side surface F2 and the second end surface F3 of the first solid propellant 3 are covered with the barrier membrane 5. The surface of second solid propellant 4 is isolated from the combustion space 6 by the barrier membrane 5. On the other hand, only the first end surface F1 of the first solid propellant 3 is exposed to the combustion space 6.

The processing device 14 and the control device 15 are electrically connected. Moreover, the processing device 14 is electrically connected with the pressure sensor device 12 and the position sensor device 13. Also, the control device 15 is electrically connected with the first igniter 7, the second igniter 8 and the thruster sections 1000.

Here, directions in FIG. 1A are defined. A direction which heads for the combustion space 6 from the first solid propellant 3 along a basic axis C of the 2-pulse gas generator 1 is defined as "a first direction". In the same way, a direction which heads for the first propellant from the combustion space 6 is defined as "a second direction". "The second direction" is the direction opposite to "the first direction". Note that in this Specification, temporarily, "the first direction" is represented by "a forward direction", and "the second direction" is represented by "an aft direction". However, depending on a kind of gas generator, there is a case that the first direction is the aft direction and that the second direction is the forward direction. In this case, the expression of "forward" in the Specification should be read "aft", and the expression of "aft" in the Specification should be read "forward".

Figure 2A:
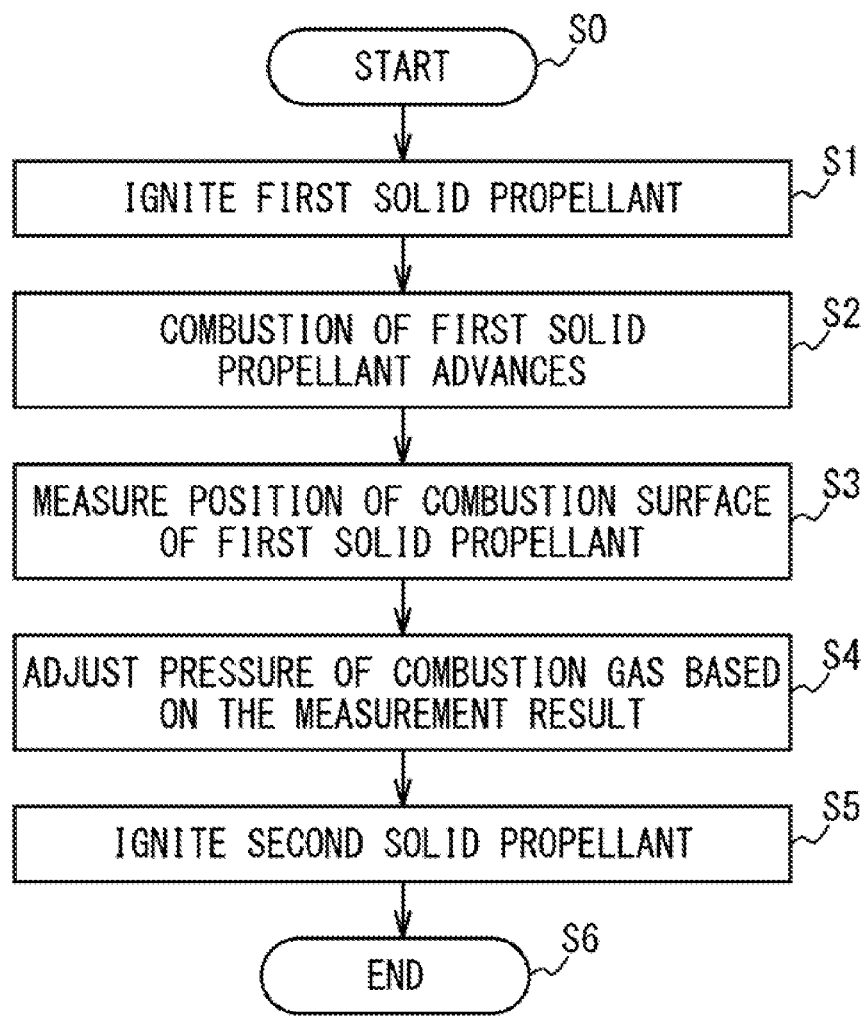
FIG. 2A is a flow chart showing an example of a method of measuring a propellant combustion surface position in the 2-pulse gas generator according to the embodiment.

The operation of 2-pulse gas generator 1 shown in FIG. 1A, especially, a method of measuring a propellant combustion surface position will be described. FIG. 2A is a flow chart showing an example of the method of measuring a propellant combustion surface position according to the embodiment.

The flow chart of FIG. 2A contains 7 steps from $0^{th}$ step S0 to sixth step S6. The flow chart of FIG. 2A begins from the $0^{th}$ step S0. FIG. 1A shows a state example of the 2-pulse gas generator 1 at the $0^{th}$ step S0. After the $0^{th}$ step S0, a first step S1 is carried out.

Figure 1B:
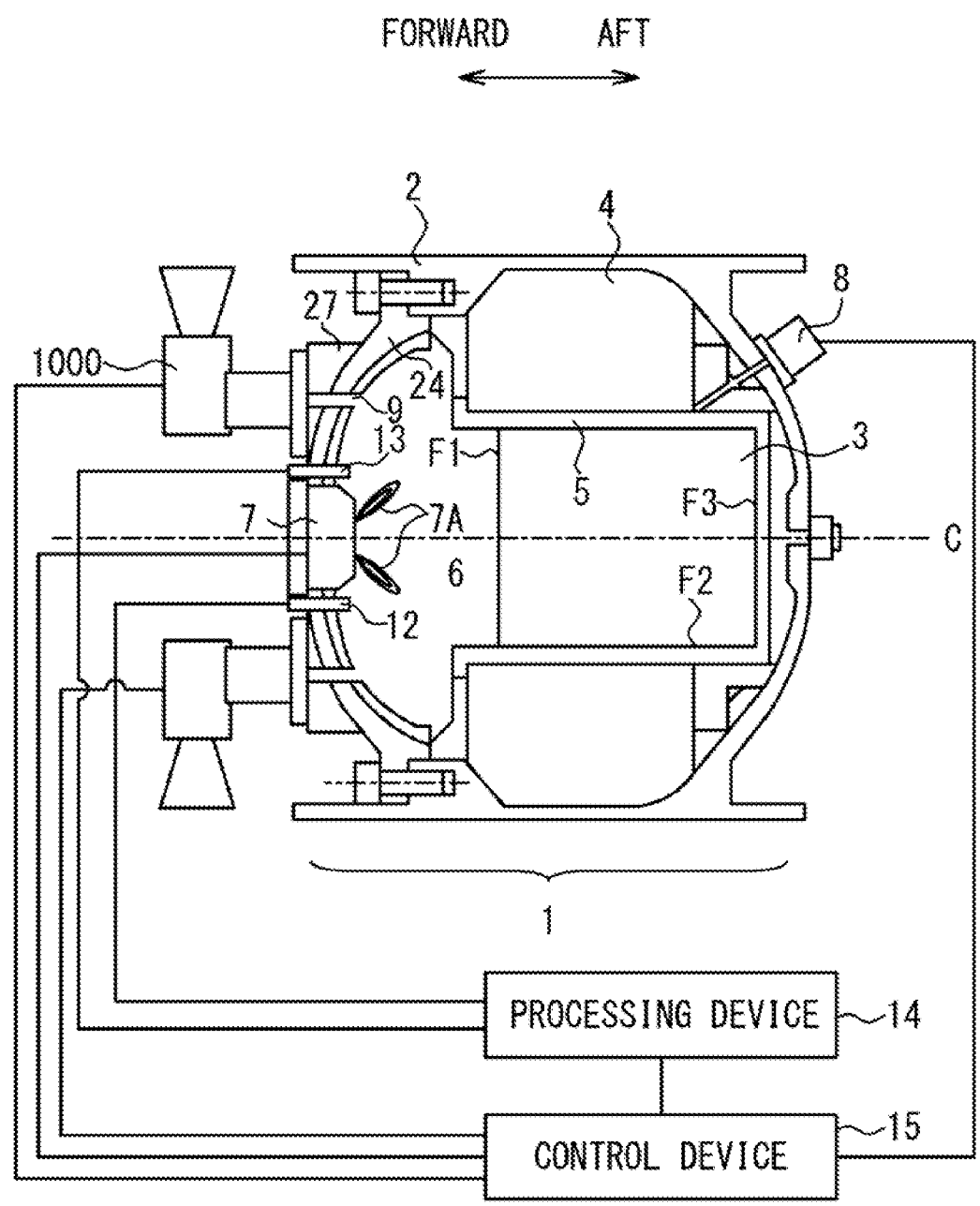
FIG. 1B is a partial cross-sectional view showing a configuration example in a second state of the 2-pulse gas generator according to the embodiment.

At the first step S1, the first igniter 7 ignites the first solid propellant 3. Here, the first igniter 7 may ignite under the control of the control device 15. More specifically, by fire 7A outputted from the first igniter 7, only the first end surface F1 of the first solid propellant 3 begins to combust. After that, the combusting surface of the surfaces of the first solid propellant 3 is called a combustion surface F1'. The combustion surface F1' coincides with the first end surface F1 immediately after the start of combustion. In other words, the side surface F2 and the second end surface F3 which are covered with the barrier membrane 5 do not combust. Also, the second solid propellant 4 which is covered with the barrier membrane 5, too, does not combust. FIG. 1B is a partial cross-sectional view showing a configuration example of the 2-pulse gas generator 1 according to the embodiment in the second state corresponding to the first step S1. After the first step S1, a second step S2 is carried out.

Figure 1C:
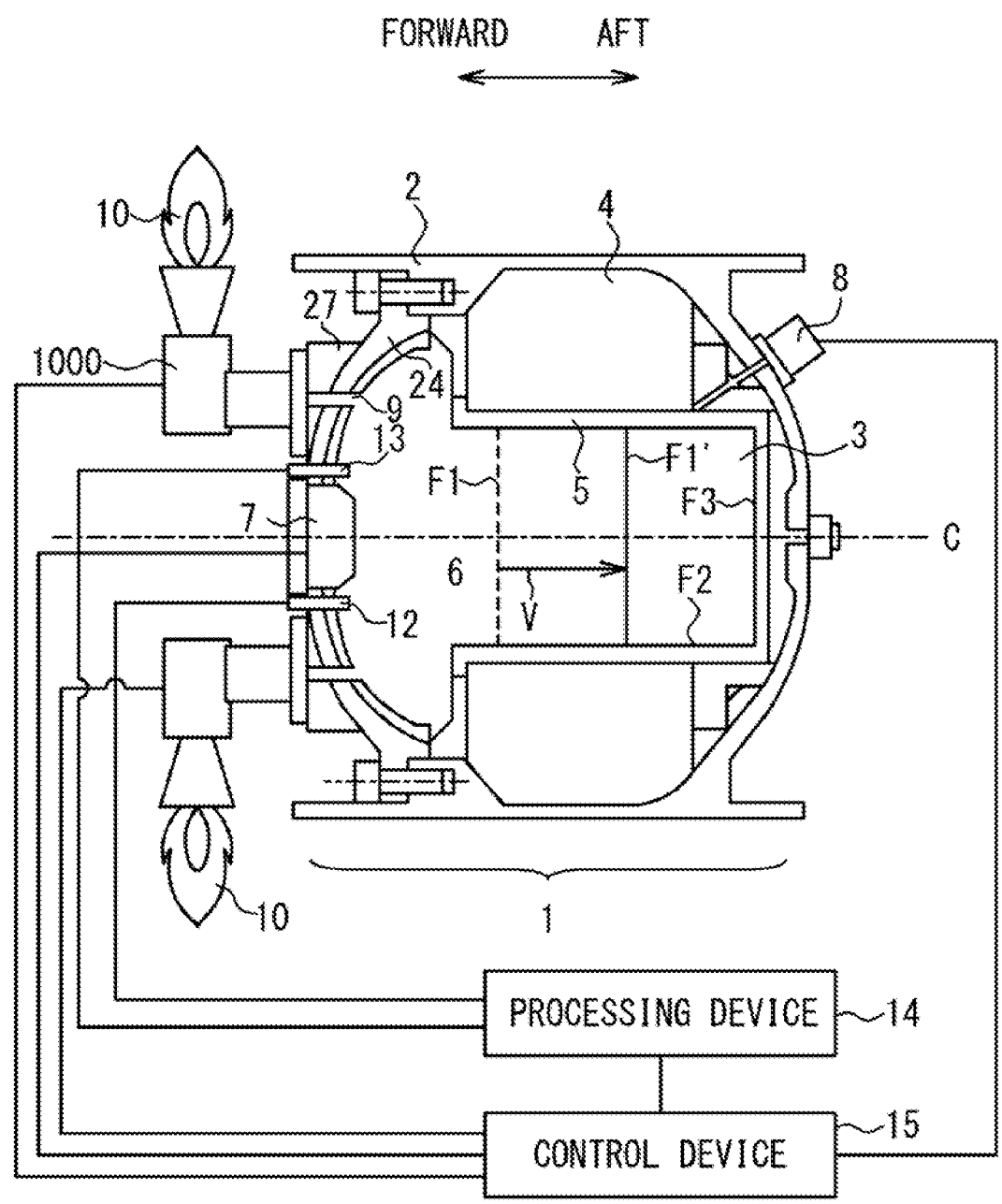
FIG. 1C is a partial cross-sectional view showing a configuration example in a third state of the 2-pulse gas generator according to the embodiment.
Figure 3A:
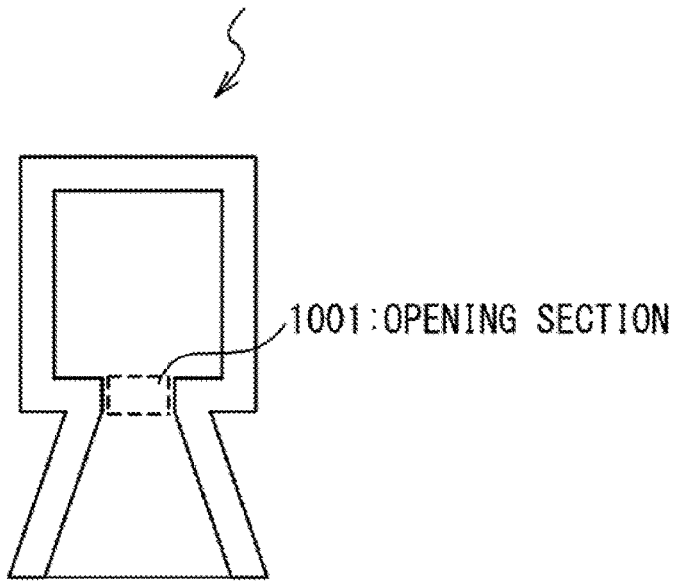
FIG. 3A is a cross-sectional view showing a configuration example of an opening section of a thruster in the 2-pulse gas generator according to the embodiment.
Figure 3B:
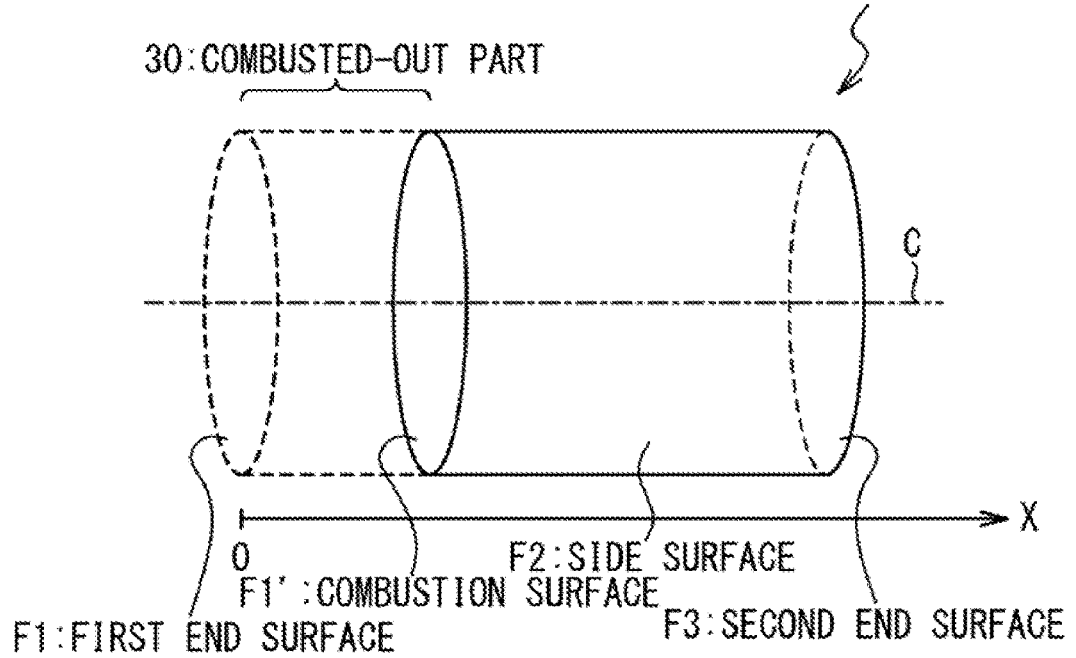
FIG. 3B is a perspective view showing a configuration example of the first solid propellant in the 2-pulse gas generator according to the embodiment.

At the second step S2, the combustion of the first solid propellant 3 advances. More specifically, it is desirable that the combustion surface F1' moves to the second direction along the basic axis C while keeping parallelism approximately to the first end surface F1 before the start of combustion. Such movement of the combustion surface F1' can be realized, for example, when the composition of the first solid propellant 3 is uniform, and the area of cross section of the first solid propellant 3 orthogonal to the basic axis C always has a constant shape. A combusted-out part 30 of the first solid propellant 3 which has been lost through the combustion becomes a combustion gas 10, which passes through the combustion gas exhaust hole 9 from the combustion space 6 to each thruster section 1000, and is exhausted outside through an opening section 1001. FIG. 1C is a partial cross-sectional view showing a configuration example of the 2-pulse gas generator 1 according to the embodiment in the third state corresponding to the second step S2. FIG. 3A is a cross sectional view showing a configuration example of the opening section 1001 in the thruster section 1000. FIG. 3B is a diagram showing an example of the first solid propellant 3 when the combusted-out part 30 is produced. After the second step S2, a third step S3 is carried out.

At the third step S3, the control device 15 measures the position of combustion surface F1' of the first solid propellant 3 by the sensor and so on. More specifically, the control device 15 detects the position of combustion surface F1' on the basic axis C by the position sensor device 13 and the processing device 14. At this time, the measurement of the position of combustion surface F1' may be carried out in always-on measurement or in fixed-point measurement according to the configuration of position sensor device 13. The measurement of the position of combustion surface F1' in the always-on measurement and the fixed-point measurement will be described later more specifically. After the third step S3, a fourth step S4 is carried out.

At the fourth step S4, the control device 15 adjusts the pressure of combustion gas 10 based on the measurement result acquired at the third step S3. More specifically, the control device 15 carries out a control of increasing or decreasing the area of the opening section 1001 of the thruster section 1000 to control the pressure of combustion gas 10 in the combustion space 6 and to adjust the combustion pressure of the first solid propellant 3. As an example, a burning rate can be increased by making the pressure high, and the burning rate can be decreased by making the pressure low oppositely. Thus, the 2-pulse gas generator 1 according to the present embodiment becomes possible to switch at an optional timing from a combustion step of the first solid propellant 3 to a combustion step of the second solid propellant 4. Next, a fifth step S5 is carried out next to the fourth step S4.

Figure 1D:
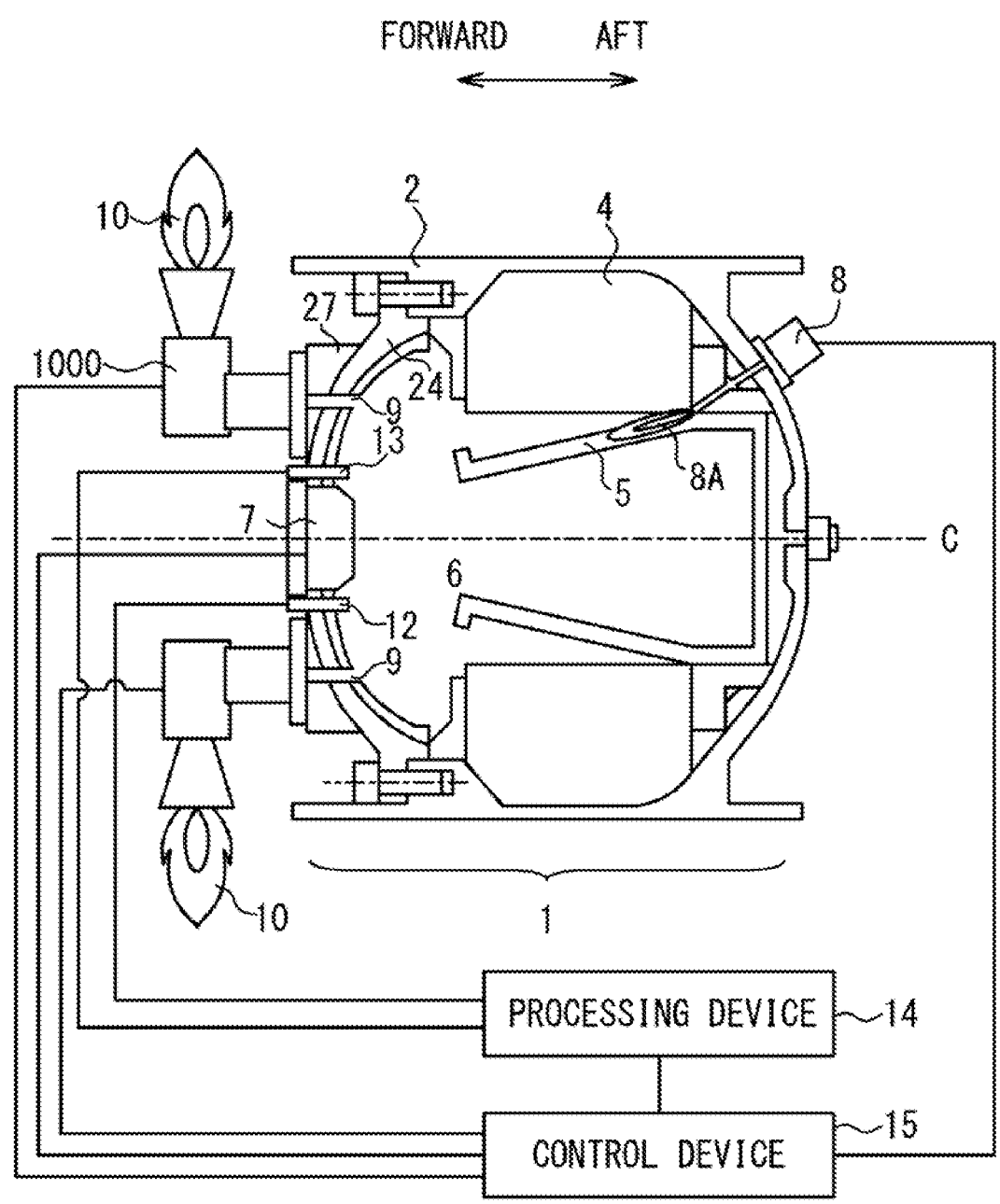
FIG. 1D is a partial cross-sectional view showing a configuration example in a fourth state of the 2-pulse gas generator according to the embodiment.

At the fifth step S5, the second igniter 8 ignites the second solid propellant 4 at an optional timing after the first solid propellant 3 is fully combusted out. Here, the second igniter 8 may ignite under the control of the control device 15. Also, it is desirable that the shape of barrier membrane 5 to protect the surface of second solid propellant 4 is transformed suitably so that the surface of second solid propellant 4 is exposed to the combustion space 6, immediately before the second igniter 8 ignites the second solid propellant 4. FIG. 1D is a partial cross-sectional view showing a configuration example of the 2-pulse gas generator 1 according to the embodiment in a fourth state corresponding to the fifth step S5. After the fifth step S5, a sixth step S6 is carried out.

At the sixth step S6, the method of measuring a propellant combustion surface position according to the present embodiment ends. However, the operation of generating the combustion gas 10 by the 2-pulse gas generator 1 according to the embodiment may continue at least until the combustion of the second solid propellant 4 ends.

As described above, the 2-pulse gas generator 1 shown in FIG. 1A first ignites the first solid propellant 3, and generates the combustion gas 10 through the combustion of the first solid propellant 3. Next, the 2-pulse gas generator 1 ignites the second solid propellant 4 at an optional timing after the first solid propellant 3 has combusted out fully, and further generates the combustion gas 10 when the second solid propellant 4 combusts. Thus, the 2-pulse gas generator 1 according to the embodiment can supply the required combustion gas at an optional timing.

However, a pattern of consumption speed of the generated combustion gas 10 which is exhausted outside from the thruster sections 1000 does not always coincide with a previously set operation pattern. This is because the operation of thruster sections 1000 sometimes changes according to a target for which the missile loaded with the 2-pulse gas generator 1 heads, a situation of the periphery of the missile and so on. In the 2-pulse gas generator 1 having the configuration shown in FIG. 1A, it is difficult to ignite the second solid propellant 4 unless the first solid propellant 3 has combusted out.

Figure 2B:
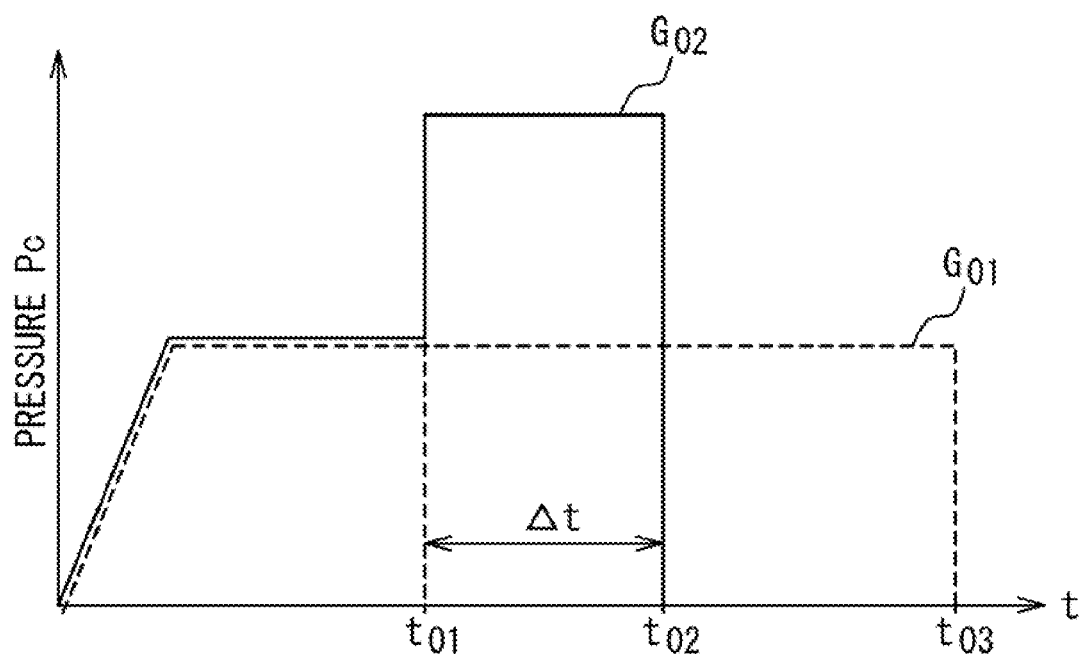
FIG. 2B is a graph showing a change example of a combustion plan of a first solid propellant in the 2-pulse gas generator according to the embodiment.

Referring to FIG. 2B, it will be described that the combustion end time of the first solid propellant 3 can be adjusted, by changing a combustion pattern of the first solid propellant 3 after the start of combustion. FIG. 2B is a graph showing a change example of combustion plan of the first solid propellant 3 in the 2-pulse gas generator 1 according to the embodiment.

FIG. 2B contains a first graph $G_{01}$ and a second graph $G_{02}$. Common to the first graph $G_{01}$ and the second graph $G_{02}$, the horizontal axis shows time and the vertical axis shows pressure Pc.

The first graph $G_{01}$ shows an example of combustion pattern in a first plan made before the start of combustion. In the first plan of the first graph $G_{01}$, the pressure Pc is gradually raised and then the pressure Pc is kept constant. At time $t_{03}$, the combustion ends.

The second graph $G_{02}$ shows an example of combustion pattern reconsidered according to the situation after the start of combustion. The second graph $G_{02}$ shows the example of combustion pattern when the combustion should be ended at a time $t_{02}$ at which a time period $\Delta t$ has passed from a time $t_{01}$, i.e. before a time $t_{03}$. More specifically, the pressure Pc is increased higher between the time $t_{01}$ and the time $t_{02}$ to promote the consumption of propellant, so that the combustion end time can be advanced from the time $t_{03}$ to the time $t_{02}$.

Therefore, in the embodiment, to optionally set the operation pattern of the 2-pulse gas generator 1 according to the situation, containing a timing of igniting the second solid propellant 4, the consumption amount of the first solid propellant 3 is precisely estimated.

In the technique relating to the embodiment, a method is known of estimating the consumption amount of the propellant based on a total thruster opening area, a combustion pressure in a combustion space of the propellant, and a predetermined nozzle discharge coefficient:

$$dm(t)/dt = At(t) \cdot Pc(t) \cdot Cd \quad (1)$$

where,
"t" shows time,
"m(t)" which is a function of time shows a mass flow rate,
"dm(t)/dt" which is a time differentiation of the mass flow rate shows a consumption speed of the propellant,
"At(t)" which is a function of time shows the total thruster opening area which is a total summation of all the opening areas of the thruster,
"Pc(t)" which is a function of time shows a measured value of the combustion pressure in the combustion space of the propellant, and
"Cd" which is a coefficient shows the nozzle discharge coefficient.

When integrating the above equation (1) with respect to time, the following equation (2) is obtained:

$$m(t) = \int (dm(t)/dt)dt = \int (At(t) \cdot Pc(t))dt \cdot Cd \quad (2)$$

However, in the method of estimating the consumption amount of the propellant by using the above equation (2), there is a case that enough precision is not obtained. As a reason why an error is introduced into the estimated value, for example, it is considered that the area of the opening section 1001 of the thruster section 1000 changes from a predicted value due to heat and so on.

Therefore, in the embodiment, to estimate the consumption amount of the propellant in a higher precision, it is proposed to measure the position of combustion surface F1' in addition to the measurement of the combustion pressure. By combining the measurement result of the position of combustion surface and the known data of the propellant, the consumption amount of the propellant can be estimated by the following equation (3):

$$m(t) = Ab \cdot \int x(t)dt \cdot \rho \quad (3)$$

where,
"Ab" as a constant number shows the burning area of the propellant,
"x(t)" which is a function of time shows the position of combustion surface F1', and
"ρ" as a constant number shows the density of the propellant.

Note that constant numbers Ab and ρ are known at the time of manufacture of the propellant. The specific description of the method of measuring the position of the combustion surface F1' will be described later as the first embodiment to the eighth embodiment.

As an example of measuring the position of combustion surface F1', a temperature detector can be used. An initial temperature of the propellant can be detected. In this case, the total opening area of the thruster sections 1000 which is necessary at the time of the start of combustion is possible to estimate correctly from the following equation (4):

$$Pc = (C^* \cdot \rho \cdot e^{((\sigma p(T-T0))} \cdot a \cdot (Ab/At))^{(1/(1-n))} \quad (4)$$

where,
"Pc" shows a desired combustion pressure,
"C*" shows a characteristic exhaust velocity,
"σp" shows temperature sensitivity of burning rate at constant pressure,
"T" shows the temperature of the propellant,
"T0" shows a reference temperature,
"a" shows a constant number of the burning rate at the reference temperature,
"At" shows the total opening area of the thruster as an estimation object, and
"n" shows burning rate pressure exponent.

Of the parameters which appear in the above equation (4), a theory value of the characteristic exhaust velocity C* is known, and the density ρ of the propellant, the temperature sensitivity σp of the burning rate at constant pressure, the reference temperature T0, the constant number a at the reference temperature, the burning area Ab and the burning rate pressure exponent n are known at the step of manufacture. Therefore, if the temperature T of the propellant is measured, the total opening area At of the thruster sections 1000 can be correctly estimated from the above equation (4). In other words, it becomes able to precisely set the pressure at the start of combustion.

Also, by measuring the position of combustion surface F1', it becomes able to correctly estimate the total opening area of the thruster sections 1000 during the combustion. As a result, the feedback control of combustion pressure becomes able to be precisely carried out at the time of the combustion.

Figure 3C:
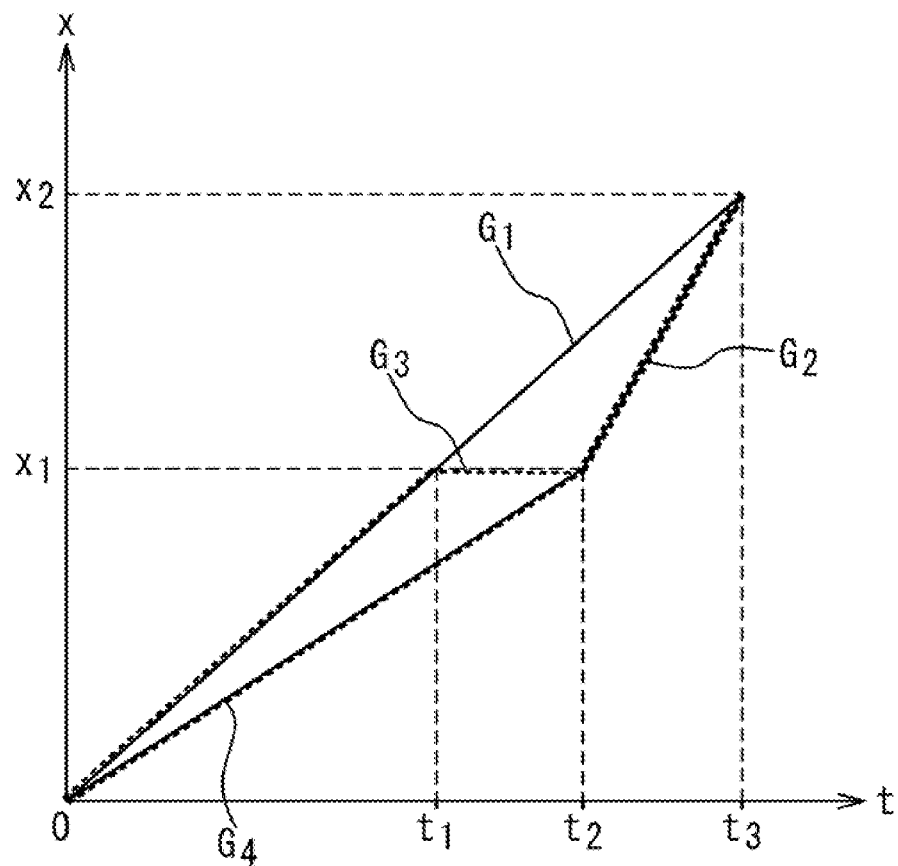
FIG. 3C is a graph showing the principle of estimating the position of combustion surface of the first solid propellant in the 2-pulse gas generator according to the embodiment.

Referring to FIG. 3C, a difference between the always-on measurement and the fixed-point measurement in the method of measuring a propellant combustion surface position will be described. FIG. 3C is a graph showing a principle of predicting the position of combustion surface of the first solid propellant 3 in the 2-pulse gas generator 1 according to the embodiment.

FIG. 3C contains four graphs of a first graph $G_1$ to a fourth graph $G_4$. The first graph $G_1$ shows a prediction of time change of the combustion surface position when the method of measuring a propellant combustion surface position according to the embodiment is not applied. The second graph $G_2$ shows a prediction of time change of the combustion surface position when the method of measuring a propellant combustion surface position according to the embodiment is applied to carry out the always-on measurement of the position of combustion surface F1'. The third graph $G_3$ shows a prediction of time change of the combustion surface position when the method of measuring a propellant combustion surface position according to the embodiment is applied to carry out the fixed-point measurement of the position of combustion surface F1' at a point $x_1$. The fourth graph $G_4$ shows an actual situation of time change of the position of combustion surface F1'. Common to the first graph $G_1$ to the fourth graph $G_4$, the horizontal axis shows time, and the vertical axis shows the position of combustion surface F1' on the basic axis C.

In the first graph $G_1$, it is predicted that the movement speed of the combustion surface position is constant from the combustion start the time 0 to the combustion end time $t_3$. The combustion surface position at the time 0 is 0, the combustion surface position at the time $t_3$ is $x_2$, and the combustion surface position at the time $t_1$ is $x_1$.

In the fourth graph $G_4$, the combustion surface positions at the time 0 and the time $t_3$ are 0 and $x_2$, respectively, and the fourth graph $G_4$ coincides with the first graph $G_1$ at these 2 points. However, on the way, the time when the combustion surface position is $x_1$ is the time $t_2$ between the time $t_1$ and the time $t_3$. Note that the movement speed of the combustion surface position is constant from the time 0 to the time $t_2$ but is slower than the prediction in the first graph $G_1$. Also, the movement speed of the combustion surface position is constant from the time $t_2$ to the time $t_3$, but faster than the prediction in the first graph $G_1$.

The second graph $G_2$ coincides with the fourth graph $G_4$, and it could be understood that the position of combustion surface F1' can be measured in a very high precision if using the always-on measurement. Note that in case of the always-on measurement, there is no limitation in the number of times of measurement, and also, the measurement can be carried out at an optional time. This number of times and this timing may be controlled by the control device.

In case of the third graph $G_3$, it is measured at the time $t_2$ that the combustion surface F1' has reached the position $x_1$. Therefore, the third graph $G_3$ coincides with the first graph $G_1$ from the time 0 to the time $t_2$. Then, the third graph $G_3$ coincides with the fourth graph $G_4$ from the time $t_2$ to the time $t_3$. Note that it is seen as if it is predicted that the combustion surface F1' is stopped at the position $x_1$ from the time $t_1$ to the time $t_2$, but this is because predictions before and after measurement are to be corrected.

First Embodiment

Referring to FIG. 4A to FIG. 4E, a method of measuring a residual amount and consumption speed of the first solid propellant 3 by using a supersonic sensor 13A will be described.

Figure 4A:
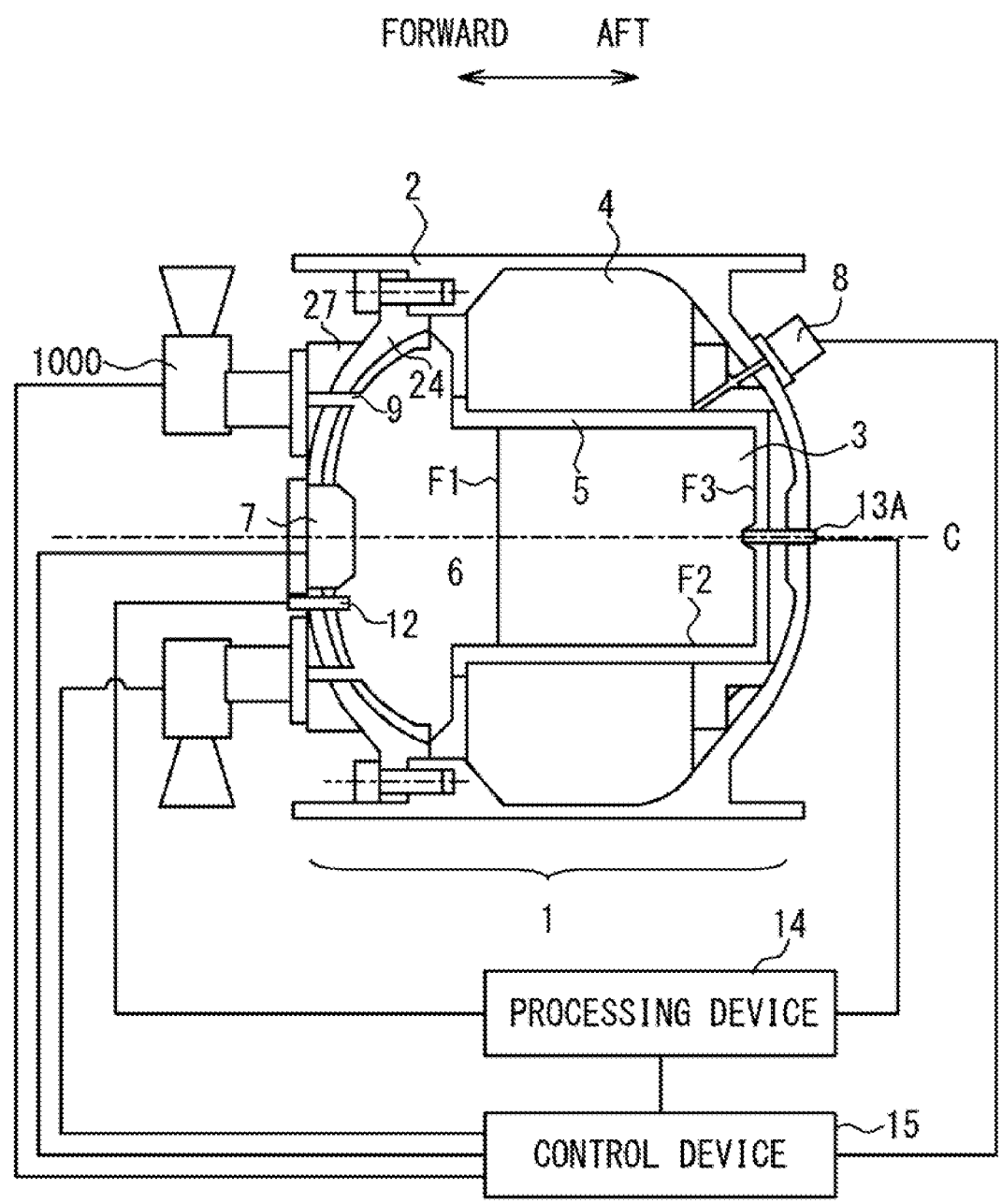
FIG. 4A is a partial cross-sectional view showing a configuration example of the 2-pulse gas generator according to the embodiment.

FIG. 4A is a partial cross-sectional view showing a configuration example of the 2-pulse gas generator 1 according to a first embodiment. The 2-pulse gas generator 1 according to the first embodiment is the same as one in which the following changes are applied to the 2-pulse gas generator 1 shown in FIG. 1A. That is, as the position sensor device 13 shown in FIG. 1A, the supersonic sensor 13A is used in FIG. 4A. Also, the position sensor device 13 in FIG. 1A is arranged in the lid section 24 but the supersonic sensor 13A of FIG. 4A is arranged in an aft portion from the first solid propellant 3, of the main section of the pressure vessel 2. More specifically, the supersonic sensor 13A of FIG. 4A passes through the pressure vessel 2 and the barrier membrane 5. The supersonic sensor 13A and the processing device 14 are electrically connected.

Figure 4B:
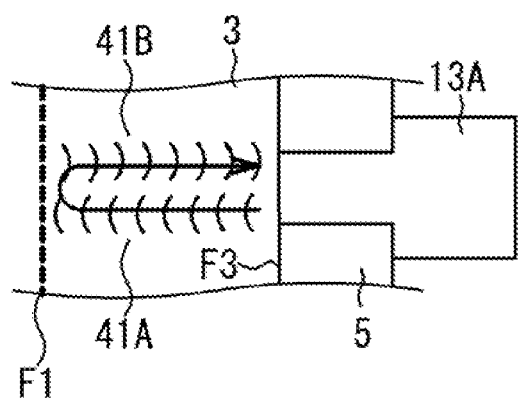
FIG. 4B is a cross-sectional view showing a configuration example in the first state of a supersonic sensor according to the embodiment.

Referring to FIG. 4B, the arrangement and operation of the supersonic sensor 13A will be described in. FIG. 4B is a cross-sectional view showing a configuration example of the supersonic sensor 13A in the first state in the first embodiment. Here, the first state is a state before the first solid propellant 3 is ignited. One of the ends of the supersonic sensor 13A is connected to the first solid propellant 3. Here, it is desirable that the end surface of the supersonic sensor 13A is arranged to be flush with a second end surface F3 where the first solid propellant 3 contacts with the barrier membrane 5.

By arranging in this way, the supersonic sensor 13A can transmit a supersonic signal for the first end surface F1 from the second end surface F3 of the first solid propellant 3. The supersonic signal which is transmitted is called a transmission wave 41A. The supersonic sensor 13A may convert an electric signal transmitted from the processing device 14 to the transmission wave 41A, to transmit for the first solid propellant 3. At this time, the processing device 14 may generate an electric signal under the control of the control device 15 to transmit for the supersonic sensor 13A.

The transmission wave 41A transmitted from the supersonic sensor 13A is reflected on the first end surface F1, and at least a part of the reflected supersonic signal is received by the supersonic sensor 13A. The supersonic signal received by the supersonic sensor 13A is called bottom wave 41B. The supersonic sensor 13A converts the received bottom wave 41B to an electric signal to transmit to the processing device 14. Thus, the processing device 14 can measure a time from the transmission of the transmission wave 41A from the supersonic sensor 13A to the reception of the bottom wave 41B as the reflected wave by the supersonic sensor 13A.

Figure 4C:
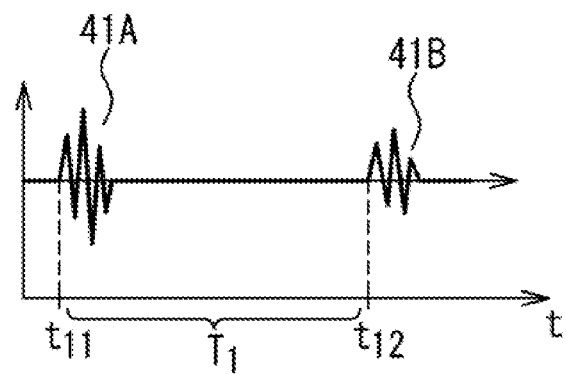
FIG. 4C is a graph showing an example of a supersonic signal transmitted and received by the supersonic sensor according to the embodiment in the first state.

Referring to FIG. 4C, it will be described that the supersonic sensor 13A in the first state shown in FIG. 4B can measure a distance from the second end surface F3 of the first solid propellant 3 to the first end surface F1. FIG. 4C is a graph showing an example of supersonic signal received by the supersonic sensor in the first state in the first embodiment. The horizontal axis of the graph of FIG. 4C shows time and the vertical axis thereof shows intensity of supersonic signal.

In an example of FIG. 4C, the supersonic sensor 13A transmits the transmission wave 41A at time $t_{11}$ and receives the bottom wave 41B at time $t_{12}$. A time period from time $t_{11}$ to time $t_{12}$ is called $T_1$. The frequency of the transmission wave 41A is known. If the propagation speed of the transmission wave 41A inside the first solid propellant 3 is known, the processing device 14 can calculate the distance from the second end surface F3 of the first solid propellant 3 to the first end surface F1.

Figure 4D:
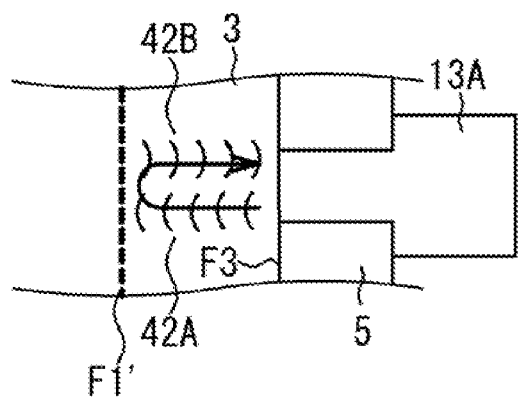
FIG. 4D is a cross-sectional view showing a configuration example in the second state of the supersonic sensor according to the embodiment.
Figure 4E:
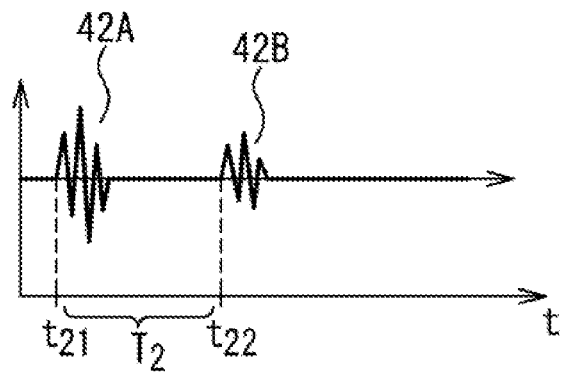
FIG. 4E is a graph showing an example of the supersonic signal transmitted and received by the supersonic sensor according to the embodiment in the second state.

Referring to FIG. 4D and FIG. 4E, a method of measuring the consumption amount of the first solid propellant 3 will be described in the second state in which the combustion has advanced to an extent after the first solid propellant 3 has been ignited.

FIG. 4D is a cross-sectional view showing a configuration example of the supersonic sensor 13A in the second state in the first embodiment. FIG. 4D is different from FIG. 4B in the first state in the following points. That is, the first solid propellant 3 is combusted, and the forward side end moves from the first end surface F1 shown in FIG. 4B to the combustion surface F1' shown in FIG. 4D. As a result, the transmission wave 42A transmitted from the supersonic sensor 13A is reflected on the combustion surface F1' so as to generate the bottom wave 42B, which is received by the supersonic sensor 13A.

FIG. 4E is a graph showing an example of the supersonic signal transmitted and received in the second state by the supersonic sensor according to the embodiment. Comparing with FIG. 4C, FIG. 4E is different in the following points. That is, the supersonic sensor 13A transmits the transmission wave 42A at time $t_{21}$, and receives the bottom wave 42B at time $t_{22}$. A time period from the time $t_{21}$ to the time $t_{22}$ is called $T_2$. Note that because the time period $T_2$ is shorter than the time period $T_1$, it could be understood that a distance from the second end surface F3 to the combustion surface F1' is shorter than the distance from the second end surface F3 to the first end surface F1.

Thus, the processing device 14 is possible to calculate the residual amount of the first solid propellant 3 in the second state based on the value of time period $T_2$. Moreover, the processing device 14 stores the time period $T_1$ measured in the first state in a predetermined storage device, and becomes possible to calculate the consumption speed of the first solid propellant 3 from the first state to the second state.

In this way, in the first embodiment, by measuring the position of combustion surface F1', the residual amount, consumption amount and consumption speed of the first solid propellant 3 can be measured in a high precision and in an optional time.

Second Embodiment

Figure 5:
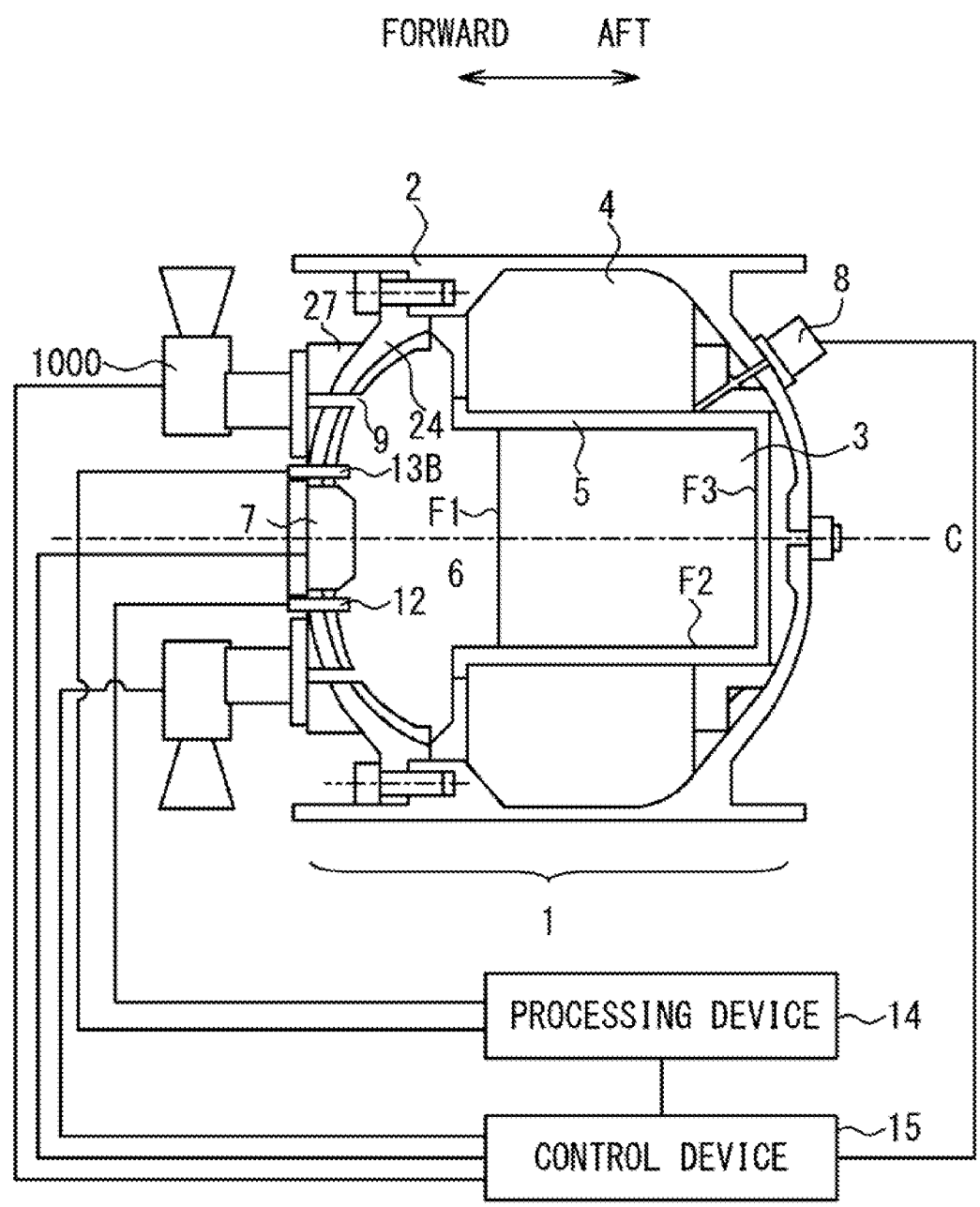
FIG. 5 is a partial cross-sectional view showing a configuration example of the 2-pulse gas generator according to the embodiment.

Referring to FIG. 5, a method of measuring the residual amount, consumption amount and consumption speed of the first solid propellant 3 by using a high replying pressure sensor 13B will be described.

FIG. 5 is a partial cross-sectional view showing a configuration example of the 2-pulse gas generator 1 according to a second embodiment. The 2-pulse gas generator 1 according to the second embodiment is obtained by applying the following changes to the 2-pulse gas generator 1 shown in FIG. 1A. That is, the high response pressure sensor 13B is used as the position sensor device 13 shown in FIG. 1A. The high response pressure sensor 13B may be arranged in the lid section 24 to measure the pressure of the combustion space 6 as shown in FIG. 5.

The operations of high response pressure sensor 13B and the operation of processing device 14 in the second embodiment will be described. The high response pressure sensor 13B continues to acquire the pressure of the combustion space 6 continuously in a predetermined sampling period, and transmits an electric signal showing the measurement result to the processing device 14. The processing device 14 carries out Fast Fourier Transform (FFT) to a plurality of sampling signals received from the sensor 13B, to carry out frequency analysis of the pressure in the combustion space 6. From the result obtained in this way, a natural frequency of the combustion gas 10 generated when the first solid propellant 3 is combusted can be detected in the direction of the basic axis C. This natural frequency corresponds to the distance from the surface of the lid section 24 to the combustion surface F1' inside the combustion space 6. Therefore, the position of combustion surface F1' can be calculated based on the detected natural frequency.

Note that the high response pressure sensor 13B has the performance to make it possible to continue to acquire the pressure in the combustion space 6 continuously in the sampling period which is necessary to carry out frequency analysis of the pressure in the combustion space 6 as mentioned above. However, the pressure sensor device 12 may have the same performance. In such a case, the pressure sensor device 12 carries out the above operation of the high response pressure sensor 13B, and as a result, the high response pressure sensor 13B can be omitted.

In this way, in the second embodiment, by measuring the position of combustion surface F1', the residual amount, consumption amount and consumption speed of the first solid propellant 3 can be measured in a high precision at an optional time.

Third Embodiment

Figure 6A:
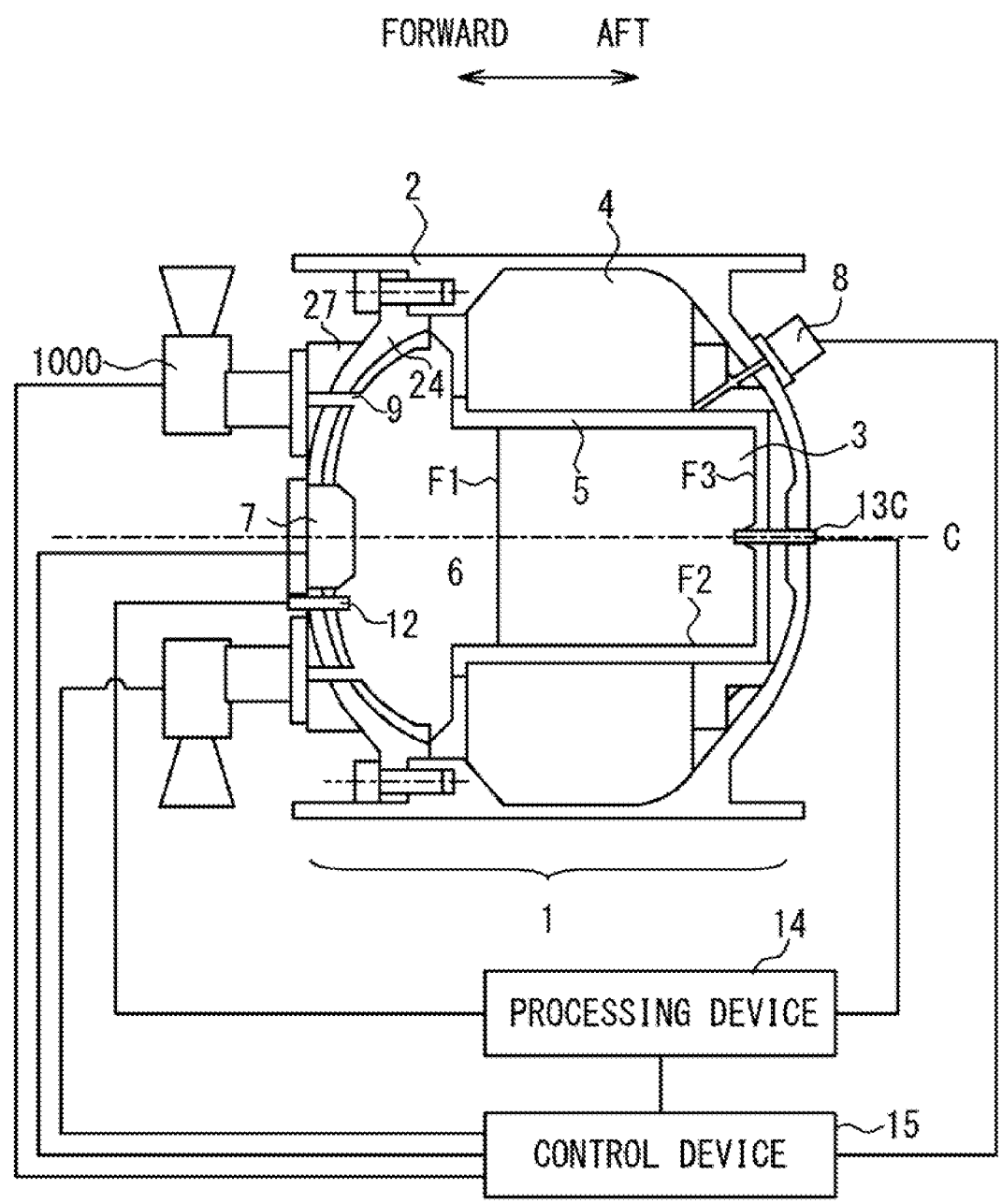
FIG. 6A is a partial cross-sectional view showing a configuration example of the 2-pulse gas generator according to the embodiment.
Figure 6B:
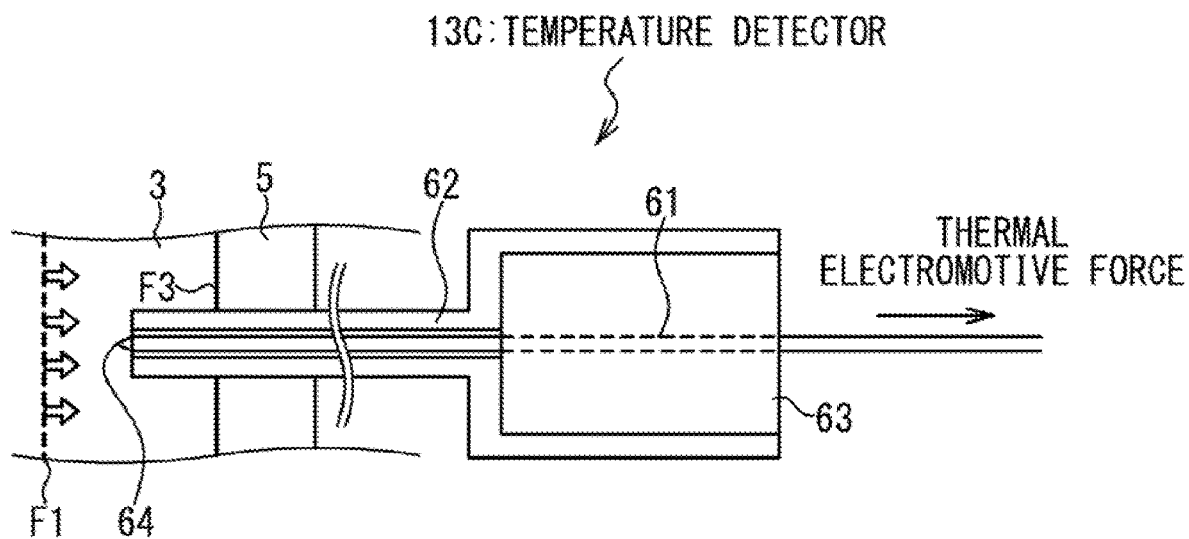
FIG. 6B is a partial cross-sectional view showing a configuration example in the first state of a temperature detector according to the embodiment.
Figure 6C:
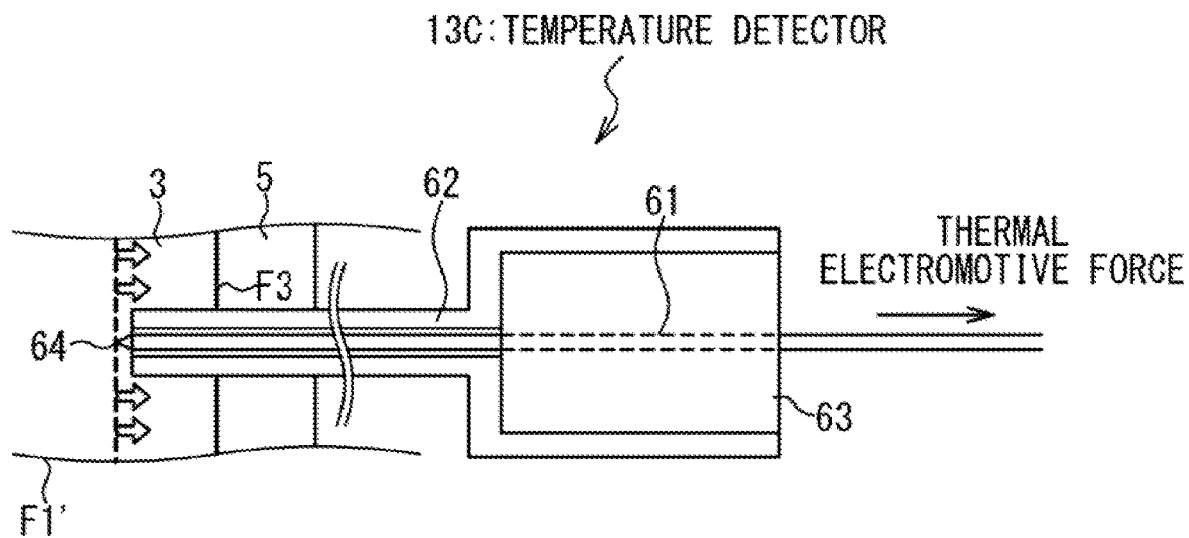
FIG. 6C is a partial cross-sectional view showing a configuration example in the second state of the temperature detector in the embodiment.

Referring to FIG. 6A to FIG. 6C, a method of measuring the residual amount, consumption amount and consumption speed of the first solid propellant 3 by using a temperature detector 13C will be described.

FIG. 6A is a partial cross-sectional view showing a configuration example of the 2-pulse gas generator 1 according to a third embodiment. The 2-pulse gas generator 1 according to the third embodiment is achieved by applying the following changes to the 2-pulse gas generator 1 shown in FIG. 4A. That is, instead of the supersonic sensor 13A shown in FIG. 4A, the temperature detector 13C is arranged. The temperature detector 13C includes a thermocouple 61 to be mentioned later, a protective tube 62 and an airtight seal 63. The thermocouple 61 has a temperature measuring contact point 64 and two electrodes (not shown). The protective tube 62 passes through the pressure vessel 2 and the barrier membrane 5 and moreover enters the inside of first solid propellant 3.

FIG. 6B is a partial cross-sectional view showing a configuration example of the temperature detector 13C in the first state in the third embodiment. Here, the first state is a state before the first solid propellant 3 is ignited. The protective tube 62 has entered the inside of first solid propellant 3 in a forward direction from the second end surface F3, i.e. to a predetermined position for the first end surface F1. Also, it is desirable that the thermocouple 61 is arranged inside the protective tube 62, and the temperature measuring contact point 64 of thermocouple 61 is exposed from the tip of the protective tube 62. It is desirable that the position of temperature measuring contact point 64 on the basic axis C is known. The end of the protective tube 62 in an opposite direction to the first solid propellant 3 is sealed with an airtight seal 63. Both of the electrodes of thermocouple 61 which are arranged in opposite direction to the temperature measuring contact point 64 are electrically connected with the processing device 14.

The processing device 14 measures a thermal electromotive force between the electrodes of thermocouple 61 to determine the temperature in the temperature measuring contact point 64. In the first state shown in FIG. 6B, the temperature measuring contact point 64 of thermocouple 61 is embedded inside the first solid propellant 3. Therefore, the temperature calculated by the processing device 14 in the first state is the temperature of the first solid propellant 3.

Referring to FIG. 6C, it will be described that by using the temperature detector 13C shown in FIG. 6B, it is possible to detect that the combustion surface F1' of the first solid propellant 3 has reached a predetermined position. FIG. 6C is a partial cross-sectional view showing a configuration example of the temperature detector 13C in the second state in the third embodiment. The second state is a state that the combustion of the first solid propellant 3 advances so that the combustion surface F1' has reached the position of temperature measuring contact point 64 of thermocouple 61. In this second state, since the temperature measuring contact point 64 of thermocouple 61 contacts the combustion surface F1', the temperature of the temperature measuring contact point 64 calculated by the processing device is the temperature of the combustion surface F1', i.e. the temperature of the combustion gas 10.

When attention should be paid to a change of the temperature detected by the temperature detector 13C before and after the second state, it could be understood that a rapid change from the temperature of the first solid propellant 3 to the temperature of combustion gas 10 occurs. The processing device 14 detects such a rapid change so that the moment when the combustion surface F1' has reached the position of temperature measuring contact point 64 can be detected in a high precision in the 2-pulse gas generator 1 according to the third embodiment.

By arranging a plurality of temperature detectors 13C such that the positions of the temperature measuring contact points 64 on the basic axis C are different, the moment when the combustion surface F1' reaches each temperature measuring contact point 64 can be individually detected.

In this way, in the third embodiment, by detecting the moment when the combustion surface F1' reaches a known position, the residual amount and consumption amount of the first solid propellant 3 at the moment can be measured in the high precision. Also, by carrying out such detection plural times, the consumption speed of the first solid propellant 3 can be measured in the high precision.

Fourth Embodiment

Figure 7A:
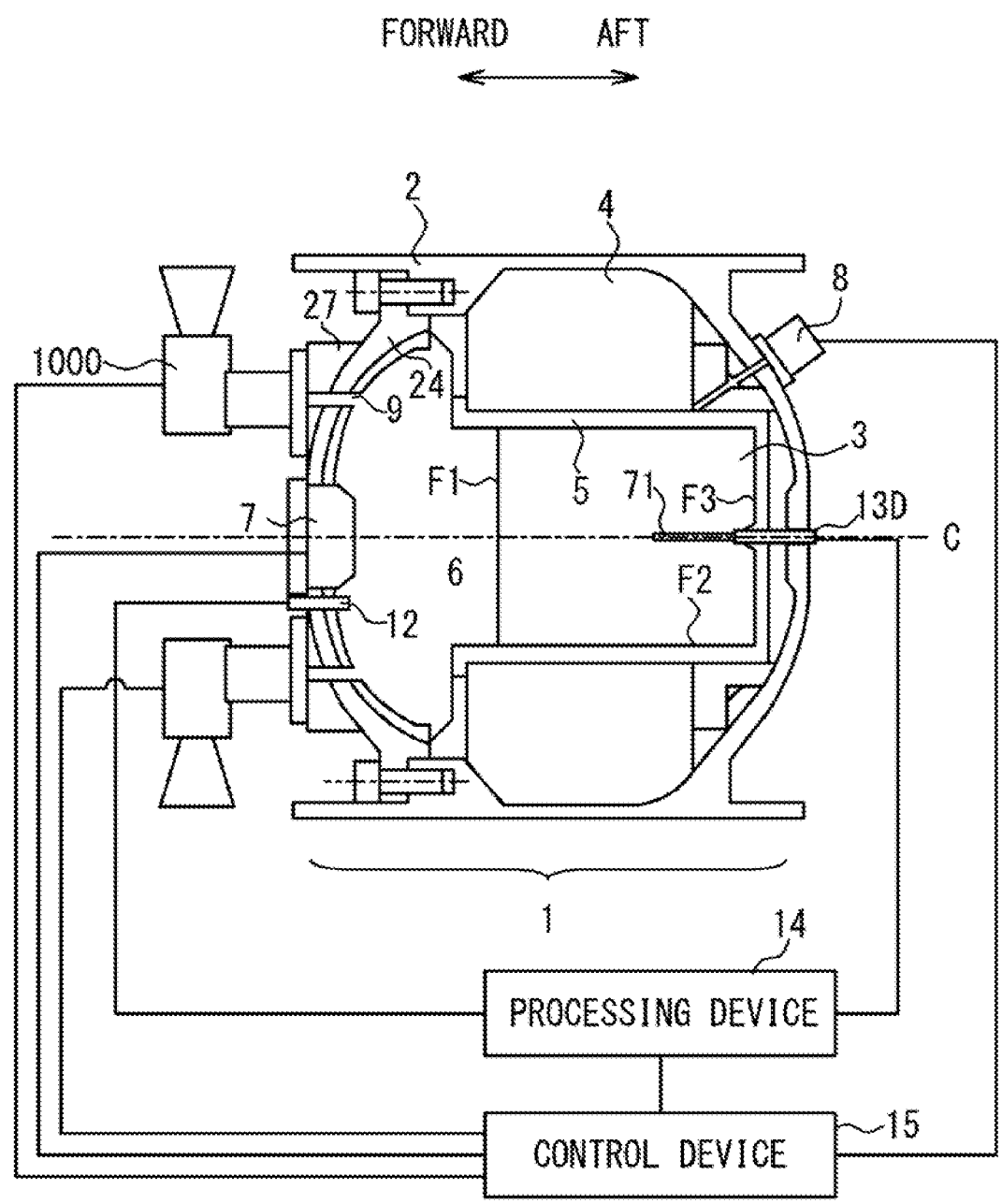
FIG. 7A is a partial cross-sectional view showing a configuration example of the 2-pulse gas generator according to the embodiment.
Figure 7B:
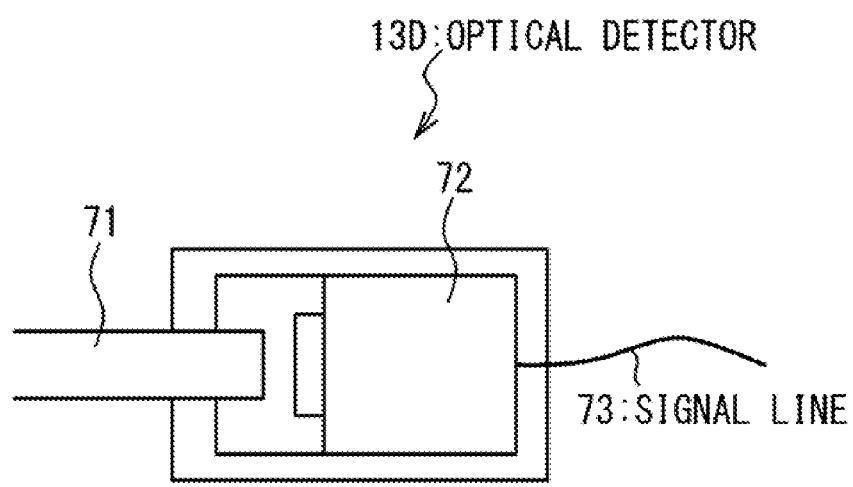
FIG. 7B is a partial cross-sectional view showing a configuration example in the first state of an optical detector according to the embodiment.
Figure 7C:
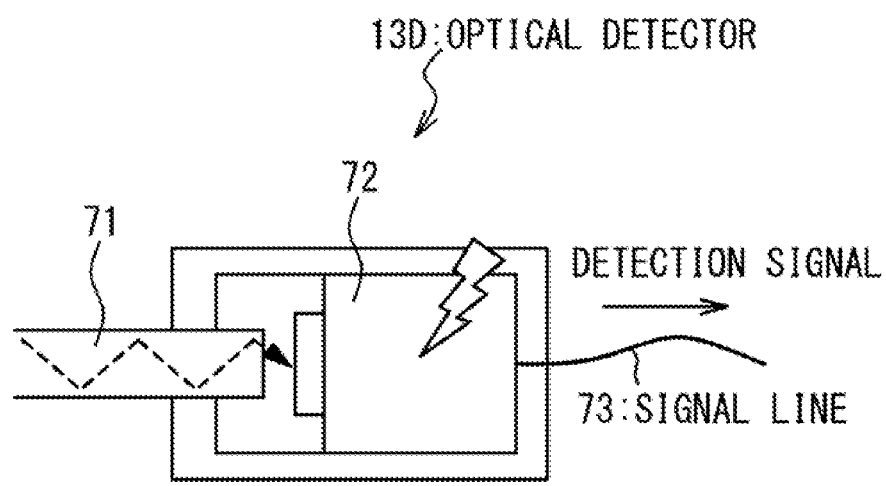
FIG. 7C is a partial cross-sectional view showing a configuration example in the second state of the optical detector according to the embodiment.

Referring to FIG. 7A to FIG. 7C, a method of measuring the residual amount, consumption amount and consumption speed of the first solid propellant 3 by using an optical detector 13D will be described.

FIG. 7A is a partial cross-sectional view showing a configuration example of the 2-pulse gas generator 1 according to the embodiment. The 2-pulse gas generator 1 according to the embodiment is achieved by applying the following changes to the 2-pulse gas generator 1 shown in FIG. 6A. That is, instead of the temperature detector 13C shown in FIG. 6A, an optical detector 13D is arranged. The optical detector 13D includes an optical fiber 71 to be mentioned later, a photo-coupler 72 and a signal line 73. The optical fiber passes through the pressure vessel 2 and the barrier membrane 5 and moreover goes inside the first solid propellant 3.

FIG. 7B is a partial cross-sectional view showing a configuration example of the optical detector 13D in the first state in a fourth embodiment. Here, the first state is a state before the first solid propellant 3 is ignited. The optical fiber 71 is inserted to a predetermined position inside the first solid propellant 3 from the second end surface F3 in a forward direction, i.e. for the first end surface F1. It is desirable that the position of the first end section of optical fiber 71 on the basic axis C is known. The second end section of optical fiber 71 is optically connected with a light inputting section of a photo-coupler 72. That is, the light inputted from the first end section of optical fiber 71 propagates through the inside of optical fiber 71 and is supplied to the photo-coupler 72. The photo-coupler 72 converts the supplied light into an electric signal to transmit to the processing device 14 through the signal line 73. Note that the first solid propellant 3 has transmissivity to the light. However, in the first state, because there is no light source inside the pressure vessel 2, there is not light that inputs to the first end section. After that, when the combustion of the first solid propellant 3 starts, the light turns on in the combustion space 6 through the combustion. However, the optical detector 13D cannot detect this light until the combustion surface F1' reaches a predetermined position from the first end section of optical fiber 71, even if there is light supplied to the first end section. A distance from this predetermined position to the first end section of optical fiber 71 is determined based on the intensity of the light in the combustion space 6 through the combustion of the first solid propellant 3, the transmissivity of the first solid propellant 3 to this light, and the sensitivity of the optical detector 13D to this light. It is desirable that this distance is previously known through a preliminary experiment and so on.

Referring to FIG. 7C, it will be described that it is possible to detect that the combustion surface F1' of the first solid propellant 3 has reached the predetermined position, by using the optical detector 13D shown in FIG. 7B. FIG. 7C is a partial cross-sectional view showing a configuration example of the optical detector 13D in the second state in the fourth embodiment. The second state is a state that the combustion of the first solid propellant 3 advances so that the combustion surface F1' has reached a position of a predetermined distance from the first end section of optical fiber 71. In this second state, because the combustion surface F1' has approached the first end section of optical fiber 71 sufficiently, the light in the combustion space 6 is detected by the optical detector 13D. The position of combustion surface F1' on the basic axis C can be calculated based on the detection result by the optical detector 13D, the transmissivity of the first solid propellant 3 and the sensitivity of the optical detector 13D.

As mentioned above, because the first solid propellant 3 has the transmissivity to the light generate by the combustion, the optical detector 13D starts to detect the light from before the combustion surface F1' has reached the first end section of optical fiber 71. After that, until the combustion surface F1' reaches the first end section of optical fiber 71 at least, the consumption speed of the first solid propellant 3 can be calculated based on the intensity of light generated through the combustion of first solid propellant 3, the transmissivity of first solid propellant 3, and the sensitivity of the optical detector 13D.

By arranging a plurality of the optical detectors 13D such that the positions of first end sections of respective optical fibers 71 on the basic axis C are different, the position and moving speed of the combustion surface F1' can be detected over the full length of the first solid propellant 3.

Fifth Embodiment

Figure 8A:
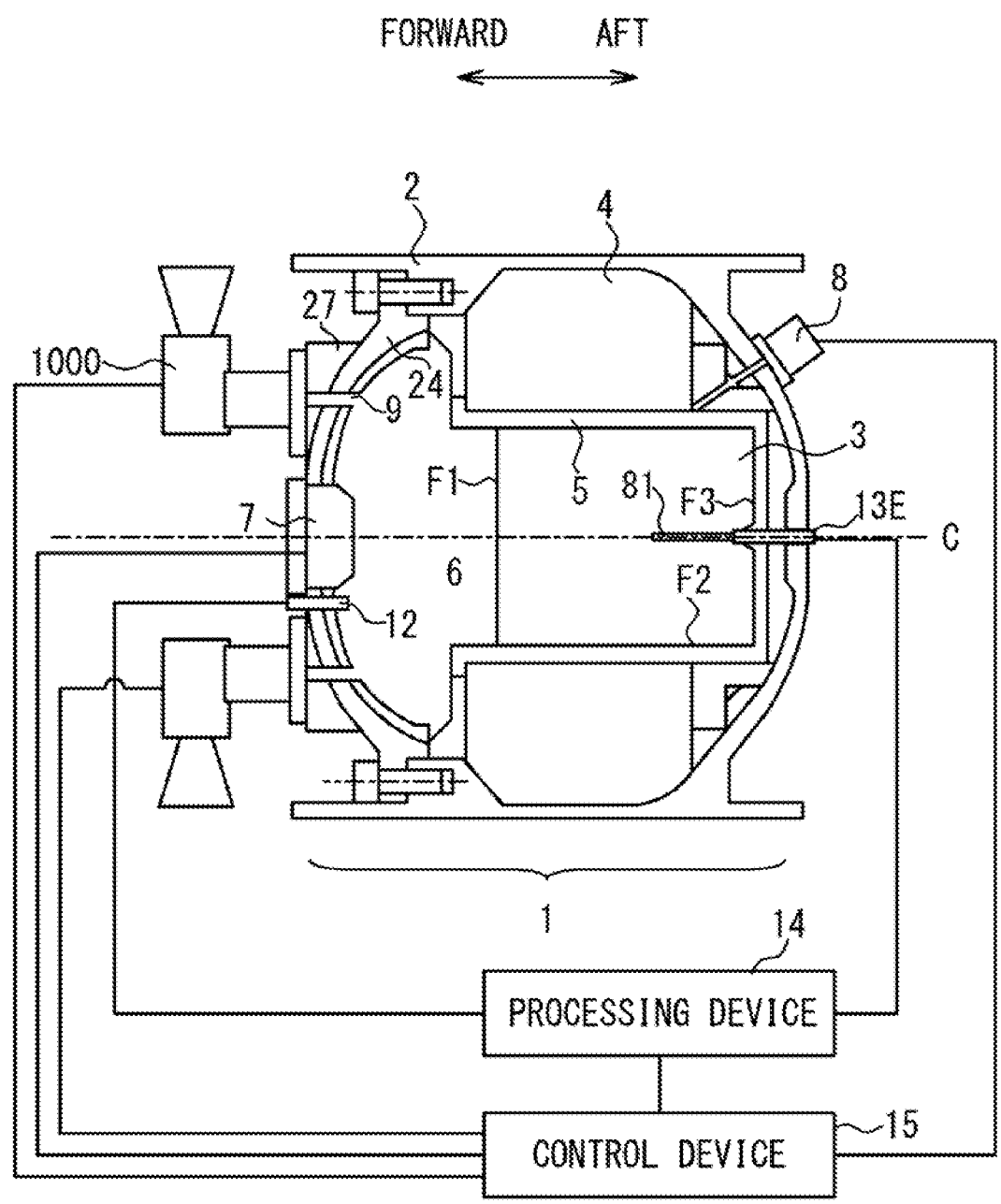
FIG. 8A is a partial cross-sectional view showing a configuration example of the 2-pulse gas generator according to the embodiment.
Figure 8B:
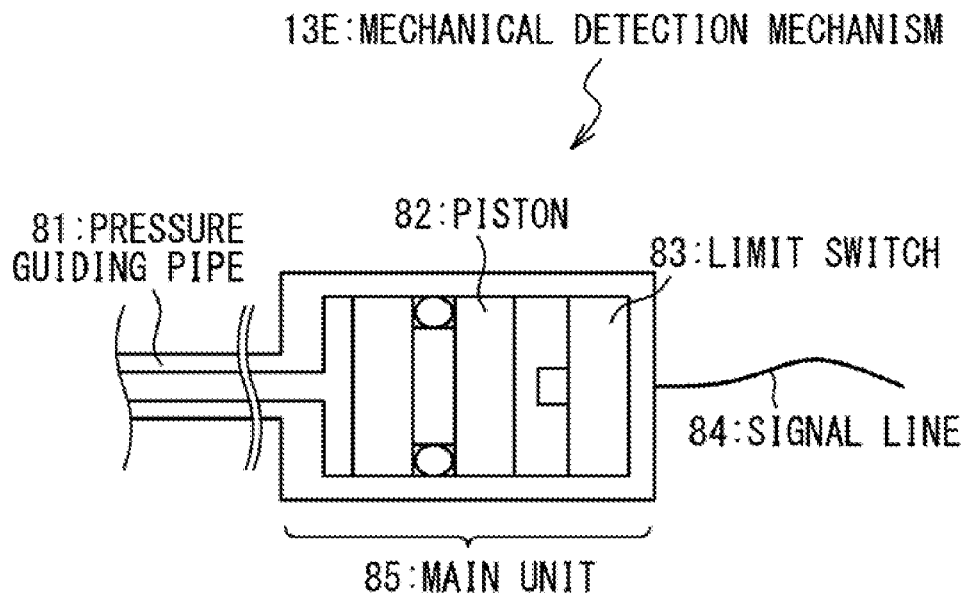
FIG. 8B is a partial cross-sectional view showing a configuration example in the first state of a mechanical detection mechanism according to the embodiment.
Figure 8C:
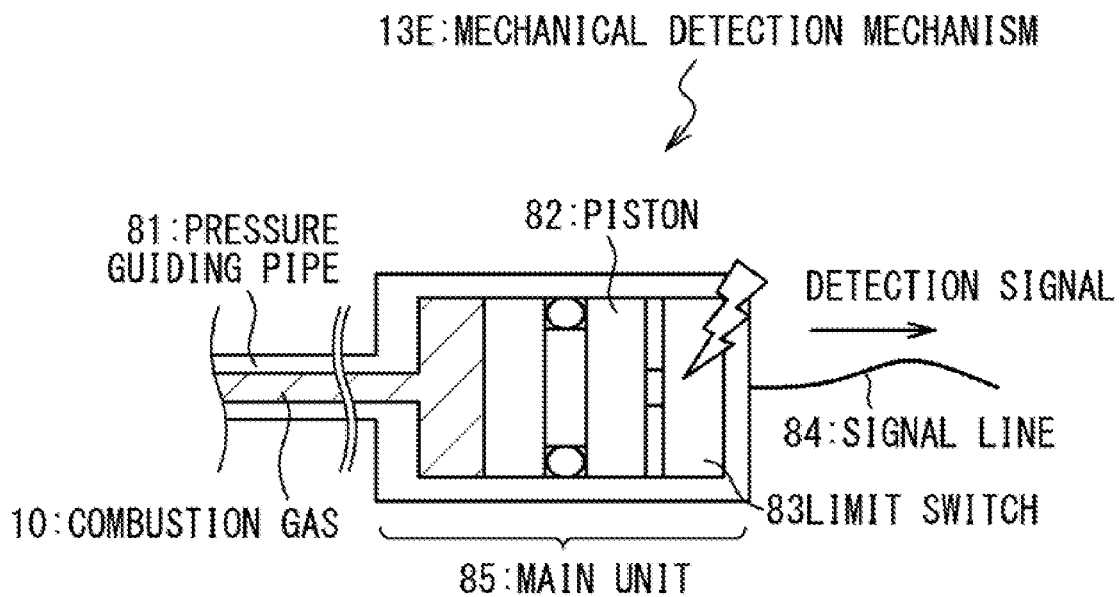
FIG. 8C is a partial cross-sectional view showing a configuration example in the second state of the mechanical detection mechanism according to the embodiment.

Referring to FIG. 8A to FIG. 8C, a method of measuring a residual amount, consumption amount and consumption speed of the first solid propellant 3 by using a mechanical detection mechanism 13E will be described.

FIG. 8A is a partial cross-sectional view showing a configuration example of 2-pulse gas generator 1 according to a fifth embodiment. The 2-pulse gas generator 1 according to the fifth embodiment is the same as a generator obtained by applying the following changes to the 2-pulse gas generator 1 shown in FIG. 6A. That is, instead of the temperature detector 13C shown in FIG. 6A, the mechanical detection mechanism 13E is arranged. The mechanical detection mechanism 13E includes a pressure guiding pipe 81 to be described later, a piston 82, a limit switch 83, a signal line 84 and a main unit 85. The pressure guiding pipe 81 passes through the pressure vessel 2 and the barrier membrane 5 to the inside of first solid propellant 3.

FIG. 8B is a partial cross-sectional view showing a configuration example of mechanical detection mechanism 13E in the first state in the fifth embodiment. Here, the first state is a state before the first solid propellant 3 is ignited. The pressure guiding pipe 81 is in the inside of first solid propellant 3, i.e. to a predetermined position for the first end surface F1 in a forward direction from the second end surface F3. It is desirable that the position of a first end of the pressure guiding pipe 81 on the basic axis C is known. A second end of the pressure guiding pipe 81 is connected with the main unit 85 of the mechanical detection mechanism 13E in an airtight manner. It is desirable that main unit 85 has airtightness. The piston 82 slidable along the inner wall of main unit 85 and the limit switch 83 fixed on the inner wall of main unit 85 are arranged in the inside of main unit 85.

Referring to FIG. 8C, a method of detecting that the combustion surface F1' of the first solid propellant 3 has reached a predetermined position, by using the mechanical detection mechanism 13E shown in FIG. 8B will be described. FIG. 8C is a partial cross-sectional view showing a configuration example of mechanical detection mechanism 13E in the second state in the fifth embodiment. The second state is a state in which the combustion of the first solid propellant 3 advances so that the combustion surface F1' has reached the first end of pressure guiding pipe 81. In this second state, because the combustion surface F1' reaches the first end of the pressure guiding pipe 81, the combustion gas 10 existing in the combustion space 6 flows into the main unit 85 of the mechanical detection mechanism 13E through pressure guiding pipe 81. The inner space of the main unit 85 of the mechanical detection mechanism 13E is, for example, a columnar shape, and the main unit 85 has the piston 82 having the same sectional shape as the section of the columnar shape. The piston 82 is pressed with a gas flowing into the main unit 85 of the mechanical detection mechanism 13E and moves in a direction of the inside of main unit 85. The moving piston 82 contacts the limit switch 83 arranged inside the main unit 85 of the mechanical detection mechanism 13E. The limit switch 83 generates a detection signal in response to the contact of the piston 82, to transmit to the processing device 14 through a signal line 84. Thus, in the 2-pulse gas generator 1 according to the fifth embodiment, it is possible to detect the moment when the combustion surface F1' reaches the first end of the pressure guiding pipe 81, in a high precision.

By arranging a plurality of the mechanical detection mechanisms 13E so that the positions of the first ends of the pressure guiding pipes 81 on the basic axis C are different from each other, the moment when the combustion surface F1' reaches the first end of each pressure guiding pipe 81 can be individually detected.

In this way, in the fifth embodiment, the residual amount and consumption amount of the first solid propellant 3 can be detected in the high precision at the moment when the combustion surface F1' reaches a known position. Also, by carrying out such detection plural times, the consumption speed of the first solid propellant 3 can be measured in a high precision.

Sixth Embodiment

Figure 9:
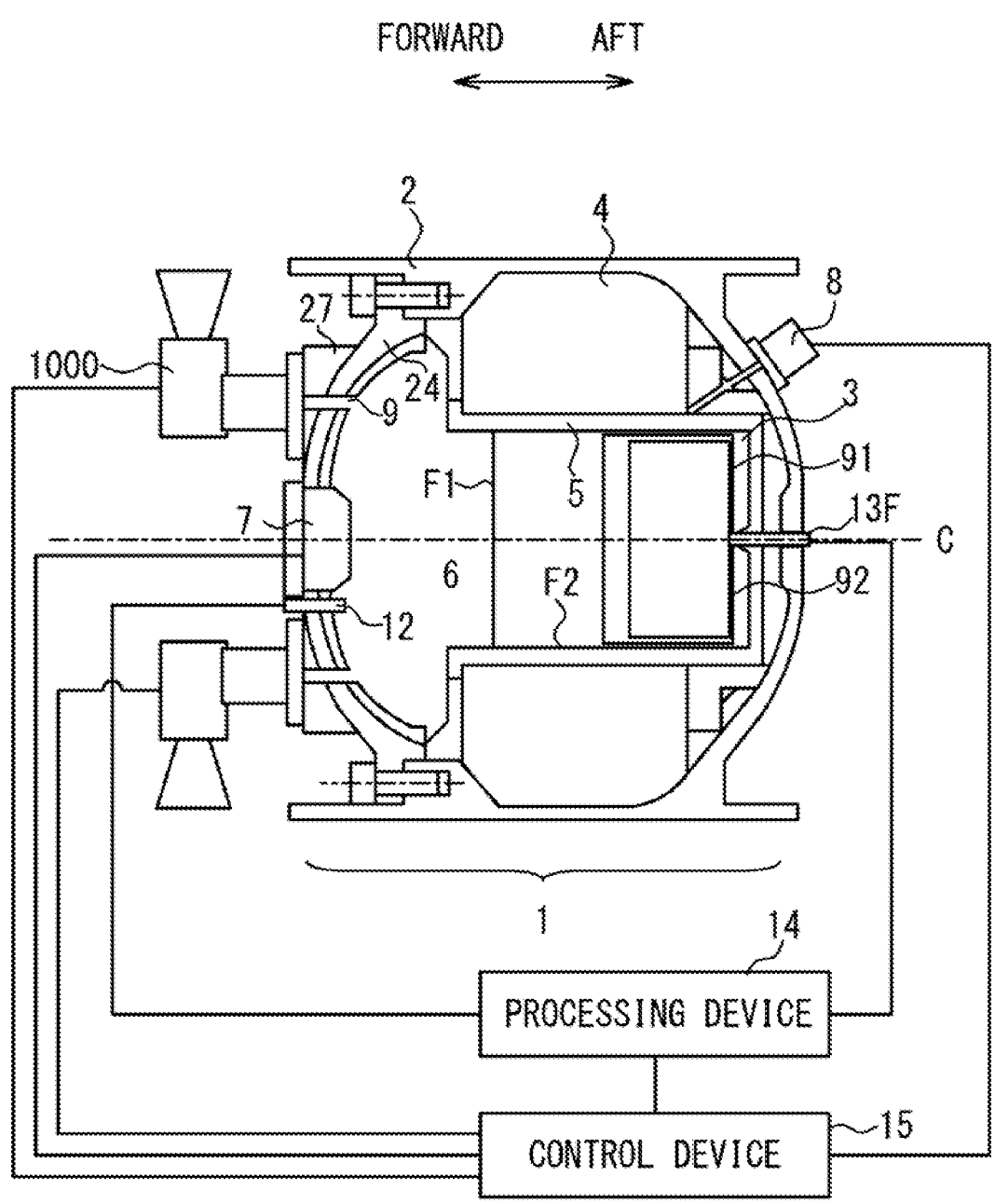
FIG. 9 is a partial cross-sectional view showing a configuration example of the 2-pulse gas generator according to the embodiment.

Referring to FIG. 9, a method of measuring the residual amount, consumption amount and consumption speed of the first solid propellant 3 by using nichrome wires 91 and 92 will be described.

FIG. 9 is a partial cross-sectional view showing a configuration example of the 2-pulse gas generator 1 according to a sixth embodiment. The 2-pulse gas generator 1 according to the sixth embodiment is the same as one obtained by applying the following changes to the 2-pulse gas generator 1 shown in FIG. 4A. That is, instead of the supersonic sensor 13A shown in FIG. 4A, a nichrome wire supporting section 13F is arranged. Moreover, the nichrome wires 91 and 92 are embedded inside the first solid propellant 3. The nichrome wire 91 is electrically connected at one of the ends with the processing device 14, and enters the inside of first solid propellant 3 through the inside of nichrome wire supporting section 13F. Also, the nichrome wire 91 passes through the inside of the nichrome wire supporting section 13F and goes out of the first solid propellant 3 through the inside of nichrome wire supporting section 13F, and is electrically connected at the other end with the processing device 14. The nichrome wire 92 is arranged in the same way. However, the positions of the tip parts on the basic axis C are different between the nichrome wires 91 and 92, viewing from the 2-pulse gas generator 1.

When the combustion of the first solid propellant 3 advances so that the nichrome wires 91 and 92 are exposed to the combustion space 6, the nichrome wires 91 and 92 are cut by the heat of combustion gas 10. The processing device 14 has a cutting detection circuit to detect that each of the nichrome wires 91 and 92 has been cut individually.

In a configuration example of FIG. 9, the two nichrome wires 91 and 92 are used but the number of nichrome wires 91 and 92 is optional, and may be one or may be equal to or more than three. Also, the different material which is cut by the heat of combustion gas 10 may be used instead of the nichrome wires 91 and 92.

In this way, in the sixth embodiment, the residual amount and consumption amount of the first solid propellant 3 can be measured in a high precision at the moment of detection of the combustion surface F1' through cutting the nichrome wires 91 and 92. Also, by carrying out such detection plural times, the consumption speed of the first solid propellant 3 can be measured in a high precision.

Seventh Embodiment

Figure 10A:
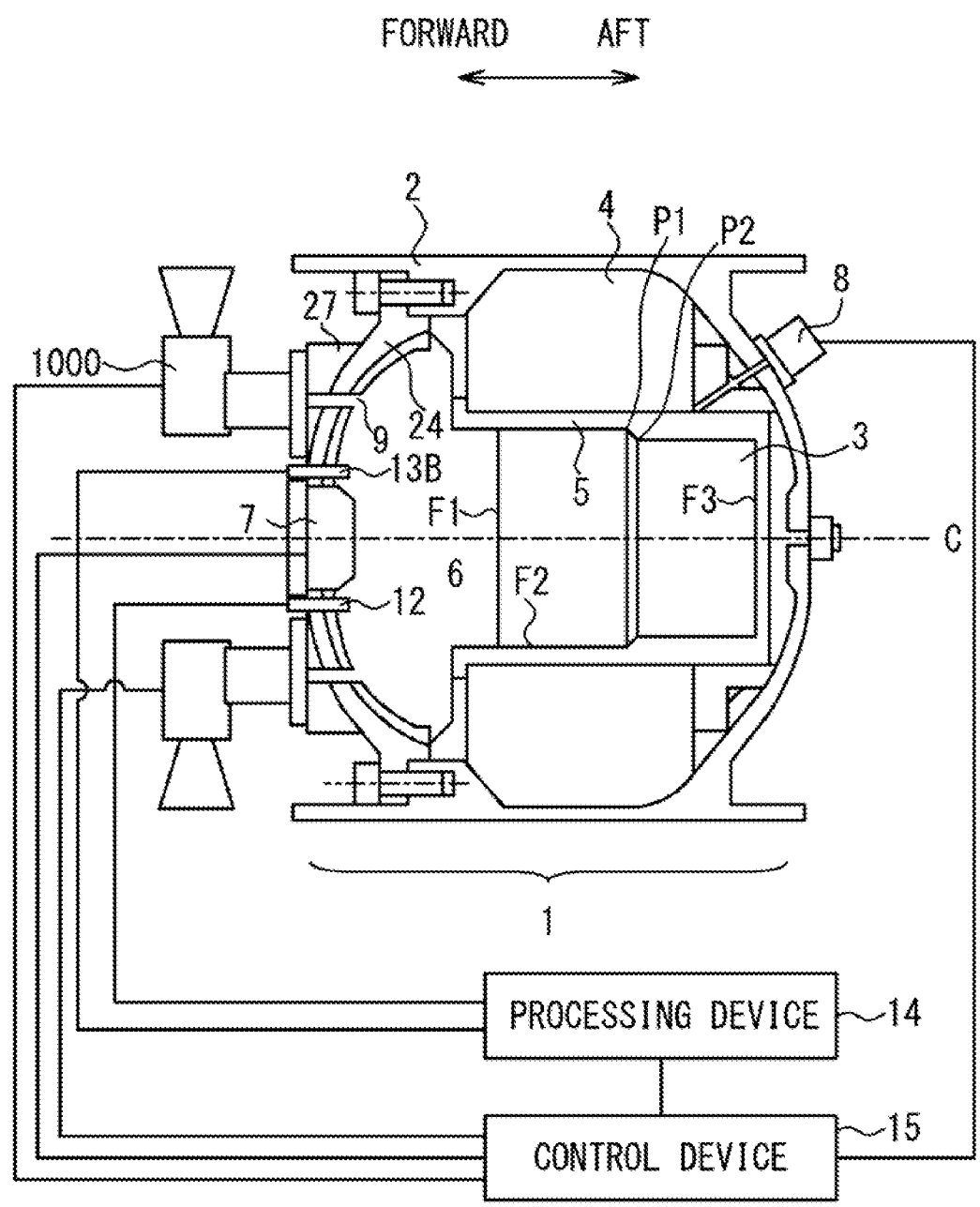
FIG. 10A is a partial cross-sectional view showing a configuration example of the 2-pulse gas generator according to the embodiment.

Referring to FIG. 10A, a method of measuring the residual amount, consumption amount and consumption speed of the first solid propellant 3 by using a prominent shape of the first solid propellant 3 and the high response pressure sensor 13B will be described.

FIG. 10A is a partial cross-sectional view showing a configuration example of the 2-pulse gas generator 1 according to a seventh embodiment. The 2-pulse gas generator 1 according to the seventh embodiment is the same as one obtained by applying the following changes to the 2-pulse gas generator 1 shown in FIG. 5. That is, a step is provided for the shape of the first solid propellant 3 shown in FIG. 5. More specifically, a part is provided in which the area of cross section orthogonal to the basic axis C changes on the way of the combustion.

In an example of FIG. 10A, a stepwise shape is formed in two positions P1 and P2 of the first solid propellant 3. More specifically, the cross-sectional area of the first solid propellant 3 is constant in a forward direction from the position P1. The cross sectional area of the first solid propellant 3 in the forward direction form the position P1 is called a first cross sectional area. Also, the cross sectional area of the first solid propellant 3 in an aft direction from the position P2 is constant. The cross-sectional area of the first solid propellant 3 in the aft direction from the position P2 is called a second cross-sectional area. In the example of FIG. 10, the second cross-sectional area is smaller than the first cross-sectional area. Note that the cross-sectional area of the first solid propellant 3 changes uniformly from the first cross-sectional area to the second cross-sectional area in the aft direction from the position P1 and in the forward direction from the position P2.

The 2-pulse gas generator 1 according to the seventh embodiment shown in FIG. 10A operates like a case of the embodiment shown in FIG. 5. That is, by measuring the pressure in the combustion space 6 by using the high response pressure sensor 13B, and carrying out frequency analysis of the pressure in the combustion space 6 by using the processing device 14, the position of combustion surface F1' is calculated. In the seventh embodiment, attention should be additionally paid to the moving speed of the combustion surface F1'. When the combustion surface F1' reaches the position P1, the cross-sectional area of the first solid propellant 3, which is constant until then, begins to decline. Therefore, the pressure in the combustion space 6 falls down, and the moving speed of the combustion surface F1' falls gradually from the position P1 as a border. After that, when the combustion surface F1' reaches the position P2, the moving speed of the combustion surface F1' falling gradually is fixed at a constant value.

Figure 10B:
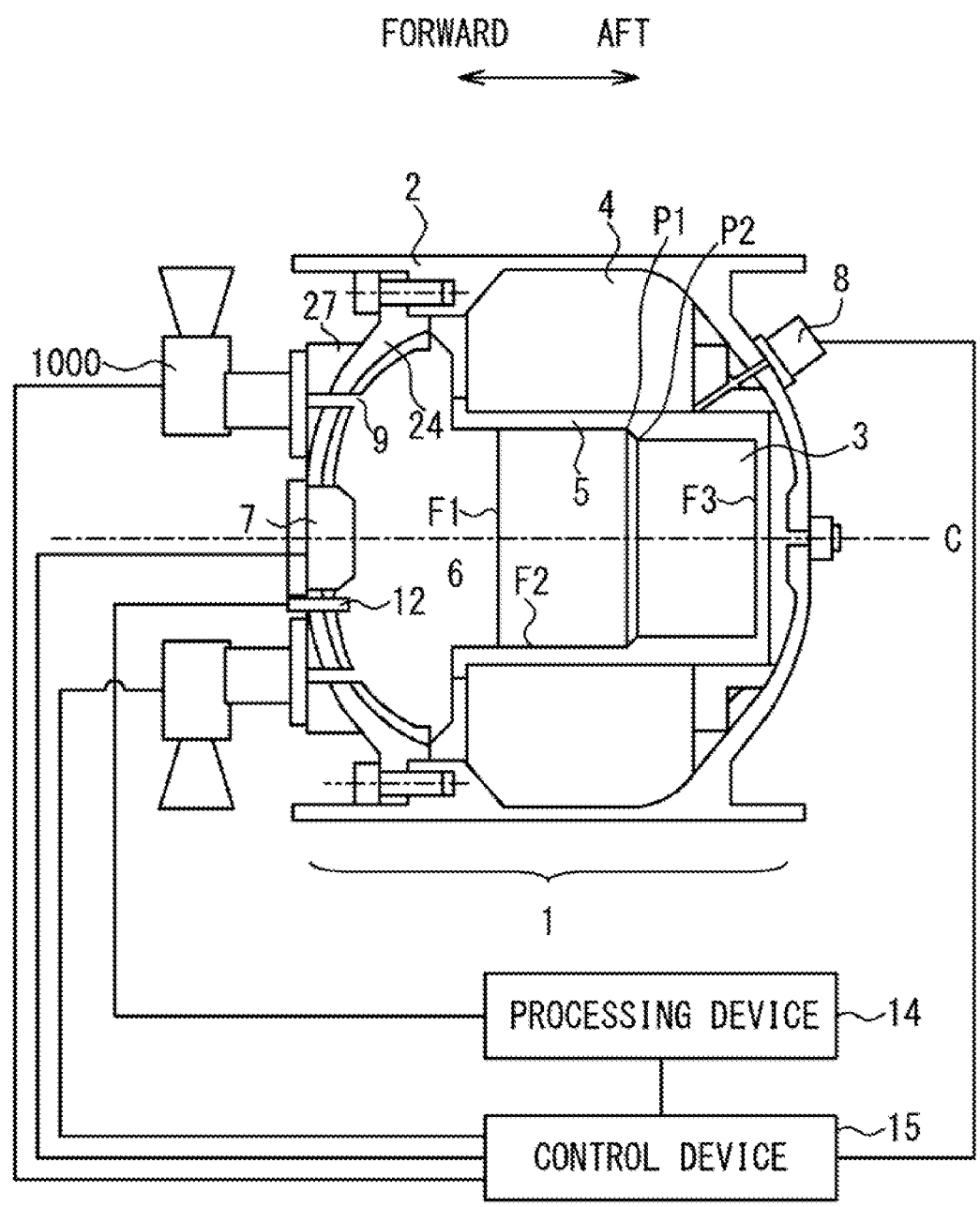
FIG. 10B is a partial cross-sectional view showing another configuration example of the 2-pulse gas generator according to the embodiment.

Referring to FIG. 10B, a modification example of the seventh embodiment shown in FIG. 10A will be described. FIG. 10B is a partial cross-sectional view showing another configuration example of the 2-pulse gas generator 1 according to the seventh embodiment. The 2-pulse gas generator 1 according to the seventh embodiment is the same as one obtained by removing the high response pressure sensor 13B from the 2-pulse gas generator 1 shown in FIG. 10A.

The 2-pulse gas generator 1 according to the seventh embodiment shown in FIG. 10B measures the pressure of combustion gas in the combustion space 6 by using the pressure sensor device 12. That is, when the combustion of the first solid propellant 3 advances, so that the combustion surface F1' reaches the position P1, the pressure of combustion gas changes. Specifically, because the cross sectional area of the first solid propellant 3 which is constant until then decreases in the aft direction from position P1, the pressure of combustion gas, too, changes. Oppositely, because the cross sectional area of the first solid propellant 3 continuing to decrease returns to a constant value in the aft direction from the position P2, the pressure of combustion gas, too, changes once again. By detecting these pressure changes by the pressure sensor device 12, the change of the cross sectional area of the first solid propellant 3 can be detected. That is, it is possible to detect that the combustion surface F1' reached the position P1 and then the position P2.

In this way, in the seventh embodiment shown in FIG. 10A and FIG. 10B, by using the first solid propellant 3 having the shape in which the cross sectional area changes as the combustion surface F1' moves along the basic axis C, it becomes possible to change the pressure of combustion gas and change the moving speed of the combustion surface F1', when the combustion surface reaches the positions where the cross sectional area changes. As a result, by detecting these changes, it is possible to detect that the combustion surface F1' has reached the position where the cross sectional area changes, in a high precision. Note that to improve the precision of such detection, it is desirable that the change of the cross sectional area is rapid. For example, by applying further changes to the configuration examples shown in FIG. 10 so that the position P1 and the position P2 are an identical position, the moving speed of the combustion surface F1' can be changed from a first fixation value to a second fixation value in a moment.

Eighth Embodiment

Figure 11A:
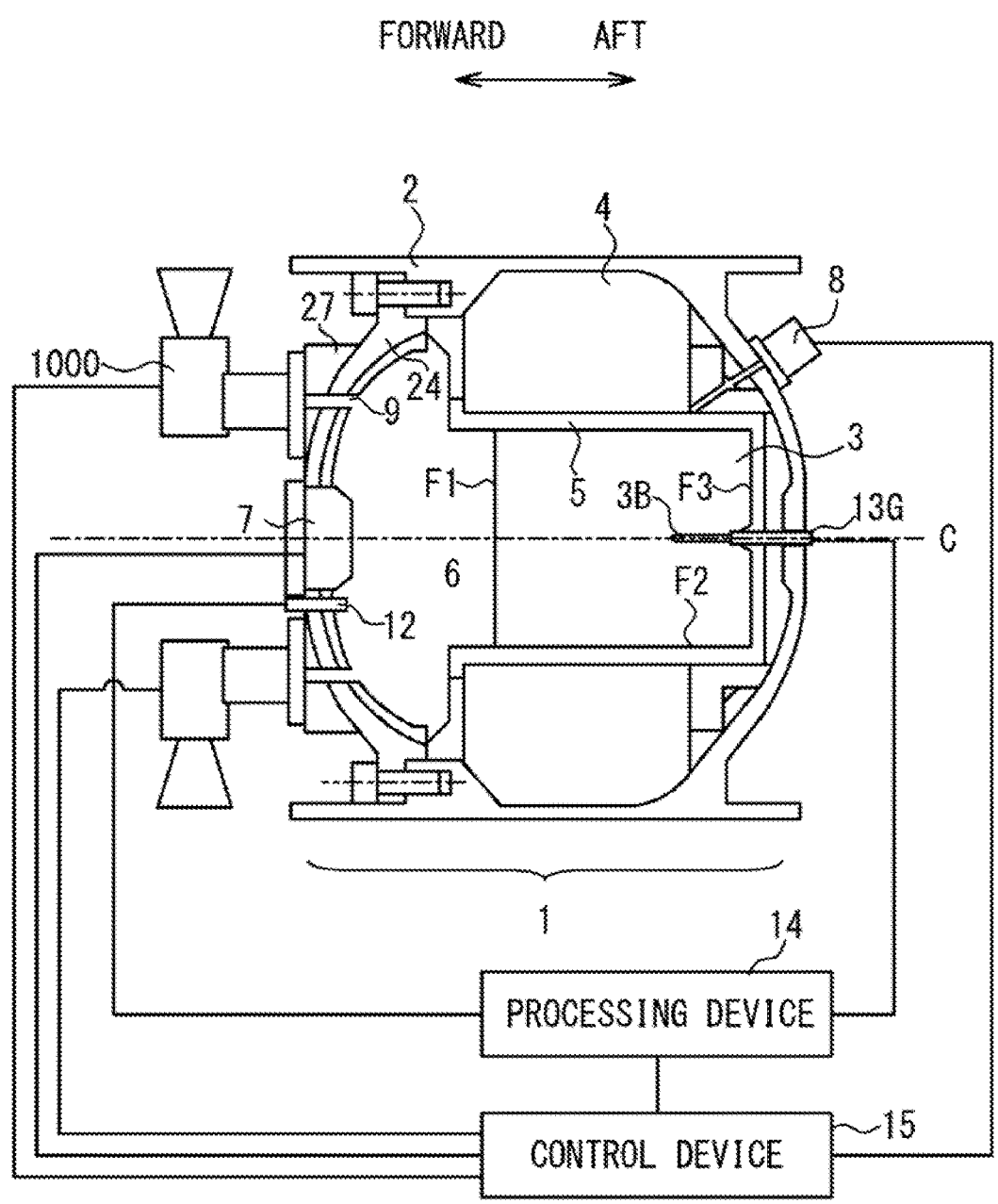
FIG. 11A is a partial cross-sectional view showing a configuration example of the 2-pulse gas generator according to the embodiment.
Figure 11B:
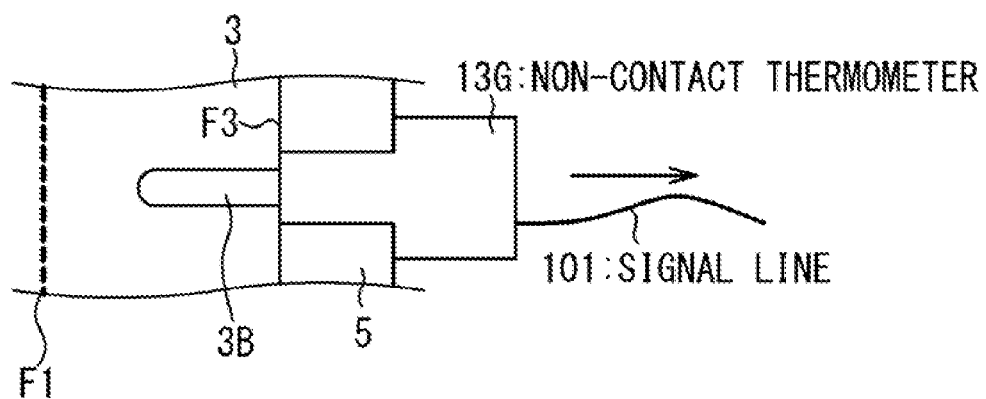
FIG. 11B is a partial cross-sectional view showing a configuration example in the first state of a non-contact thermometer according to the embodiment.
Figure 11C:
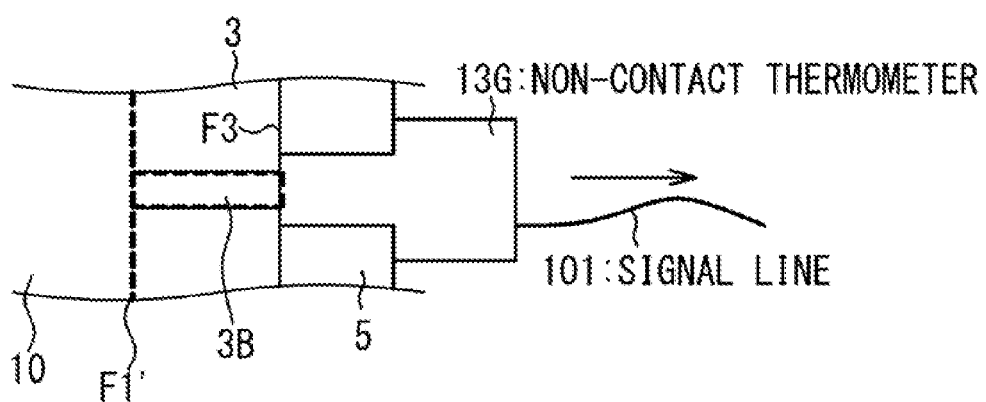
FIG. 11C is a partial cross-sectional view showing a configuration example in the second state of the non-contact thermometer according to the embodiment.

Referring to FIG. 11A to FIG. 11C, a method of measuring the residual amount, consumption amount and consumption speed of the first solid propellant 3 by using a non-contact thermometer 13G will be described.

FIG. 11A is a partial cross-sectional view showing a configuration example of the 2-pulse gas generator 1 according to an eighth embodiment. The 2-pulse gas generator 1 according to the eighth embodiment is the same as one obtained by applying the following alterations to the 2-pulse gas generator 1 shown in FIG. 4A. That is, instead of the supersonic sensor 13A shown in FIG. 4A, the non-contact thermometer 13G is arranged. The output of non-contact thermometer 13G is electrically connected with the processing device 14 through a signal line 101. Moreover, a cavity 3B is provided inside the first solid propellant 3 shown in FIG. 11A on the basic axis C.

FIG. 11B is a partial cross-sectional view showing a configuration example of the non-contact thermometer 13G in the first state in the eighth embodiment. Here, the first state is a state before the first solid propellant 3 is ignited. It is desirable that an end surface of the non-contact thermometer 13G is arranged to be flush with the second end surface F3 where the first solid propellant 3 contacts the barrier membrane 5. In other words, it is desirable that the non-contact thermometer 13G is arranged to be able to measure the temperature of material existing on the basic axis C, when viewing from the end surface.

The cavity 3B extends into the inside direction of the 2-pulse gas generator 1 from the end surface of the non-contact thermometer 13G, and has a predetermined length. In other words, a first end section of cavity 3B contacts the second end surface F3 of the first solid propellant 3, and the cavity 3B extends to a direction heading for the first end surface F1 from the second end surface F3 by a predetermined length. Furthermore, in other words, the first solid propellant 3 has an inner wall which defines the cavity 3B.

Of course, the length of cavity 3B in the direction of the basic axis C is shorter than the length of the first solid propellant 3 in the direction of the basic axis C. However, this limitation does not limit the overall shape and full length of cavity 3B.

In the first state shown in FIG. 11B, the temperature measured by the non-contact thermometer 13G is the temperature of material i.e. the first solid propellant 3 existing in the direction of basic axis C, when viewing from the end surface.

Referring to FIG. 11C, it will be described that it is possible to detect that the combustion surface F1' of the first solid propellant 3 has reached a fixed position, by using the non-contact thermometer 13G shown in FIG. 11B. FIG. 11C is a partial cross-sectional view showing a configuration example of the non-contact thermometer 13G in the second state in the eighth embodiment. Here, the second state is a state in which the combustion of the first solid propellant 3 advances so that the combustion surface F1' has reached the inner wall of the first solid propellant 3 which defines the cavity 3B. In this second state, the temperature measured by the non-contact thermometer 13G is the temperature of combustion space 6 and is the temperature of combustion gas 10.

In this case, if attention should be paid to the change of temperature detected by the non-contact thermometer 13G before and after the second state, it could be understood that a rapid change to the temperature of combustion gas 10 from the temperature of first solid propellant 3 occurs. When the processing device 14 detects such a rapid change, the moment when the combustion surface F1' has reached the cavity 3B can be detected in a high precision in the 2-pulse gas generator 1 according to the eighth embodiment.

When a plurality of the non-contact thermometers 13G and a plurality of cavities 3B respectively corresponding to these thermometers are arranged to be different in length of each cavity 3B on the basic axis C, the moment when the combustion surface F1' reaches each cavity 3B can be individually detected.

In this way, in the eighth embodiment, by detecting the moment when the combustion surface F1' has reached a known position, the residual amount and consumption amount of the first solid propellant 3 at the moment can be measured in a high precision. Also, it is possible to measure the consumption speed of the first solid propellant 3 in a high precision by carrying out such detection plural time.

As such, the present invention which was accomplished by inventors has been specifically described based on the embodiments. However, the present invention is not limited to the embodiments. It is possible to change or modify the embodiments in a range without deviating from the gist. Also, the features described in the embodiments can be freely combined in a range without any technical contradiction.

Especially, it becomes possible measure and estimate the residual amount, consumption amount and burning rate of the first solid propellant 3 in a higher precision, by combining the embodiment in which the position of combustion surface is always measured by using the supersonic sensor 13A shown in FIG. 4A and the high response pressure sensor 13B shown in FIG. 5 and the embodiment in which the temperature of combustion gas 10 and/or the first solid propellant 3 is measured by using the temperature detector 13C shown in FIG. 6A and the non-contact thermometer 13G shown in FIG. 11A. In the same way, it becomes possible to measure and estimate the residual amount, consumption amount and burning rate of the first solid propellant 3 in a still higher precision, by combining the embodiment in which the position of combustion surface is measured in the fixed-point measurement by using the optical detector 13D shown in FIG. 7A, the mechanical detection mechanism 13E shown in FIG. 8A, the nichrome wires 91 and 92 shown in FIG. 9, and the first solid propellant 3 of the stepwise shape shown in FIG. 10A and the embodiment in which the first solid propellant 3 and/or the temperature of combustion gas 10 are measured by using the temperature detector 13C shown in FIG. 6A and the non-contact thermometer 13G shown in FIG. 11A.

The present invention is based on Japanese Patent Application No. JP2018-068085 as a basis application and claims a priority based on it. The disclosure of the basis application is incorporated herein by reference.

What is claimed is:

1. A 2-pulse gas generator comprising:
    a pressure vessel provided with a combustion space therein;
    a first solid propellant arranged inside the pressure vessel, wherein a first end surface of the first solid propellant is exposed to the combustion space;
    a first igniter configured to ignite the first end surface of the first solid propellant;
    a barrier membrane provided to cover a surface of the first solid propellant other than any combustion surface such that a combustion surface of the first solid propellant moves in a predetermined first direction as combustion of first solid propellant advances;
    a position sensor device configured to detect a position of the combustion surface in the predetermined first direction; and
    a processing device configured to estimate a consumption amount of the first solid propellant based on a detection result of the position of the combustion surface,
    wherein the pressure vessel comprises:
    a thruster section configured to exhaust out a combustion gas generated by the combustion of the first solid propellant from the pressure vessel through an area adjustable opening section; and
    a pressure sensor device configured to measure a combustion pressure in the combustion space,
    wherein the processing device calculates a setting value of the combustion pressure necessary to combust out the first solid propellant by a desired time based on the detection result of the position of the combustion surface and a measurement result of the combustion pressure,
    wherein the 2-pulse gas generator further comprises:
    a control device configured to adjust the combustion pressure based on the setting value by adjusting an area of the opening section of the thruster section;
    a second solid propellant arranged inside the pressure vessel; and
    a second igniter configured to ignite the second solid propellant at the desired time,
    wherein the position sensor device detects the position of the combustion surface in the predetermined first direction at a timing controlled by the control device,
    wherein the position sensor device comprises another pressure sensor device which is a high response pressure sensor arranged to oppose the combustion surface across the combustion space and configured to measure the combustion pressure, and
    wherein the processing device analyzes frequency components of the combustion pressure measured by the high response pressure sensor, and calculates a distance from the high response pressure sensor to the combustion surface based on a frequency component having the maximum amplitude of the frequency components.

2. The 2-pulse gas generator according to claim 1, wherein the position sensor device comprises:
    an ultrasonic sensor arranged inside the first solid propellant to oppose the combustion surface, and configured to detect the position of the combustion surface in the predetermined first direction by measuring a distance to the combustion surface.

3. The 2-pulse gas generator according to claim 1, further comprising:
    a temperature measurement device configured to measure a temperature of the first solid propellant and the combustion gas.

4. The 2-pulse gas generator according to claim 1, wherein the position sensor device detects that the combustion surface has reached a predetermined position in the predetermined first direction when the combustion surface has reached the predetermined position in the predetermined first direction.

5. The 2-pulse gas generator according to claim 4, wherein the position sensor device comprises a temperature detector configured to measure a temperature of the predetermined position inside the first solid propellant.

6. The 2-pulse gas generator according to claim 4, wherein the position sensor device comprises:
an optical fiber embedded inside the first solid propellant and having one end arranged at the predetermined position; and
a photo-coupler optically connected with an other end of the optical fiber, and configured to detect a light of the combustion gas through the optical fiber when the combustion of the first solid propellant advances so that the combustion surface has reached the predetermined position, and to generate a detection signal based on detection of the light by the photo-coupler to transmit to the processing device.

7. The 2-pulse gas generator according to claim 4, wherein the position sensor device comprises a nichrome wire embedded inside the first solid propellant and having ends electrically connected with the processing device,
wherein a part of the nichrome wire which is near the first end surface in the predetermined first direction is arranged at the predetermined position, and
wherein the processing device detects that the nichrome wire has broken, to detect that the combustion surface has reached the predetermined position.

8. The 2-pulse gas generator according to claim 6, further comprising:
a temperature measurement device configured to measure a temperature of the first solid propellant and the combustion gas.

9. A 2-pulse gas generator comprising:
a pressure vessel provided with a combustion space therein;
a first solid propellant arranged inside the pressure vessel, wherein a first end surface of the first solid propellant is exposed to the combustion space:
a first igniter configured to ignite the first end surface of the first solid propellant:
a barrier membrane provided to cover a surface of the first solid propellant other than any combustion surface such that a combustion surface of the first solid propellant moves in a predetermined first direction as combustion of first solid propellant advances,
a position sensor device configured to detect a position of the combustion surface in the predetermined first direction; and
a processing device configured to estimate a consumption amount of the first solid propellant based on a detection result of the position of the combustion surface,
wherein the pressure vessel comprises:
a thruster section configured to exhaust out a combustion gas generated by the combustion of the first solid propellant from the pressure vessel through an area adjustable opening section; and
a pressure sensor device configured to measure a combustion pressure in the combustion space,
wherein the processing device calculates a setting value of the combustion pressure necessary to combust out the first solid propellant by a desired time based on the detection result of the position of the combustion surface and a measurement result of the combustion pressure,
wherein the 2-pulse gas generator further comprises:
a control device configured to adjust the combustion pressure based on the setting value by adjusting an area of the opening section of the thruster section;
a second solid propellant arranged inside the pressure vessel; and
a second igniter configured to ignite the second solid propellant at the desired time,
wherein the position sensor device detects the position of the combustion surface in the predetermined first direction at a timing controlled by the control device,
wherein the pressure sensor device is arranged to oppose the combustion surface across the combustion space, and configured to function as the position sensor device which measures the combustion pressure, and
wherein the processing device analyzes frequency components of the combustion pressure measured by the pressure sensor device, and calculates a distance from the pressure sensor device to the combustion surface based on a frequency component having the maximum amplitude of the frequency components.

10. The 2-pulse gas generator according to claim 9, further comprising:
a temperature measurement device configured to measure a temperature of the first solid propellant and the combustion gas.

11. A 2-pulse gas generator comprising:
a pressure vessel provided with a combustion space therein:
a first solid propellant arranged inside the pressure vessel, wherein a first end surface of the first solid propellant is exposed to the combustion space;
a first igniter configured to ignite the first end surface of the first solid propellant;
a barrier membrane provided to cover a surface of the first solid propellant other than any combustion surface such that a combustion surface of the first solid propellant moves in a predetermined first direction as combustion of first solid propellant advances;
a position sensor device configured to detect a position of the combustion surface in the predetermined first direction; and
a processing device configured to estimate a consumption amount of the first solid propellant based on a detection result of the position of the combustion surface,
wherein the pressure vessel comprises:
a thruster section configured to exhaust out a combustion gas generated by the combustion of the first solid propellant from the pressure vessel through an area adjustable opening section, and
a pressure sensor device configured to measure a combustion pressure in the combustion space,
wherein the processing device calculates a setting value of the combustion pressure necessary to combust out the first solid propellant by a desired time based on the detection result of the position of the combustion surface and a measurement result of the combustion pressure,
wherein the 2-pulse gas generator further comprises:
a control device configured to adjust the combustion pressure based on the setting value by adjusting an area of the opening section of the thruster section;
a second solid propellant arranged inside the pressure vessel, and
a second igniter configured to ignite the second solid propellant at the desired time, wherein the position sensor device detects that the combustion surface has reached a predetermined position in the predetermined first direction when the combustion surface has reached the predetermined position in the predetermined first direction, wherein the first solid propellant has:

a second end surface arranged to oppose the first end surface in the predetermined first direction; and a cavity having one end arranged at the predetermined position in the predetermined first direction, extending in the predetermined first direction to be apart from the first end surface and having an other end reaching the second end surface, and wherein the position sensor device comprises a non-contact thermometer arranged at the other end of the cavity, and configured to detect the temperature of the combustion gas when the combustion of the first solid propellant advances so that the combustion surface has reached the predetermined position.

12. The 2-pulse gas generator according to claim 11, further comprising:

a temperature measurement device configured to measure a temperature of the first solid propellant and the combustion gas.

13. A 2-pulse gas generator comprising:

a pressure vessel provided with a combustion space therein:

a first solid propellant arranged inside the pressure vessel, wherein a first end surface of the first solid propellant is exposed to the combustion space;

a first igniter configured to ignite the first end surface of the first solid propellant;

a barrier membrane provided to cover a surface of the first solid propellant other than any combustion surface such that a combustion surface of the first solid propellant moves in a predetermined first direction as combustion of first solid propellant advances, a position sensor device configured to detect a position of the combustion surface in the predetermined first direction; and a processing device configured to estimate a consumption amount of the first solid propellant based on a detection result of the position of the combustion surface, wherein the pressure vessel comprises:

a thruster section configured to exhaust out a combustion gas generated by the combustion of the first solid propellant from the pressure vessel through an area adjustable opening section, and a pressure sensor device configured to measure a combustion pressure in the combustion space, wherein the processing device calculates a setting value of the combustion pressure necessary to combust out the first solid propellant by a desired time based on the detection result of the position of the combustion surface and a measurement result of the combustion pressure, wherein the 2-pulse gas generator further comprises:

a control device configured to adjust the combustion pressure based on the setting value by adjusting an area of the opening section of the thruster section;

a second solid propellant arranged inside the pressure vessel, and a second igniter configured to ignite the second solid propellant at the desired time, wherein the position sensor device detects that the combustion surface has reached a predetermined position in the predetermined first direction when the combustion surface has reached the predetermined position in the predetermined first direction, and wherein the position sensor device comprises:

a main unit having airtightness;

a pressure guiding pipe embedded inside the first solid propellant, and having one end connected with the main unit in an airtight manner and an other end arranged at the predetermined position;

a piston arranged inside the main unit, and configured to move inside the main unit by the combustion gas flowing into from the other end when the combustion of the first solid propellant advances so that the combustion surface has reached the predetermined position; and a limit switch arranged inside the main unit, and configured to generate a detection signal based on the movement of the piston, and to transmit to the processing device.

14. The 2-pulse gas generator according to claim 13, further comprising:

a temperature measurement device configured to measure a temperature of the first solid propellant and the combustion gas.

15. A 2-pulse gas generator comprising:

a pressure vessel provided to have a combustion space therein;

a first solid propellant arranged inside the pressure vessel, wherein a first end surface of the first solid propellant is exposed to the combustion space;

a first igniter configured to ignite the first end surface of the first solid propellant a barrier membrane provided to cover a surface of the first solid propellant other than any combustion surface such that a combustion surface of the first solid propellant moves in a predetermined first direction as the combustion of first solid propellant advances;

a position sensor device configured to detect a position of the combustion surface in the predetermined first direction; and a processing device configured to estimate a consumption amount of the first solid propellant based on a detection result of the position of the combustion surface, wherein the pressure vessel comprises:

a thruster section configured to exhaust out a combustion gas generated by the combustion of the first solid propellant from the pressure vessel through an area adjustable opening section; and a pressure sensor device configured to measure a combustion pressure in the combustion space, wherein the processing device calculates a setting value of the combustion pressure necessary to combust out the first solid propellant by a desired time based on the detection result of the position of the combustion surface and a measurement result of the combustion pressure, wherein the 2-pulse gas generator further comprises:

a control device configured to adjust the combustion pressure based on the setting value by adjusting an area of the opening section of the thruster section;

a second solid propellant arranged inside the pressure vessel; and a second igniter configured to ignite the second solid propellant at the desired time, wherein the position sensor device detects the position of the combustion surface in the predetermined first direction at timing controlled by the control device, wherein the first solid propellant comprises:
a first part having a predetermined first cross sectional area which is an area of a cross section orthogonal to the predetermined first direction; and
a second part having another area of a cross section orthogonal to the predetermined first direction as a second cross sectional area which is different from the predetermined first cross sectional area, and
wherein the processing device detects a change of the cross sectional area from a change of the measurement result of the combustion pressure.

16. The 2-pulse gas generator according to claim 15, further comprising:
a temperature measurement device configured to measure a temperature of the first solid propellant and the combustion gas.

17. A method of measuring a propellant combustion surface in a 2-pulse gas generator comprising:
providing the 2-pulse gas generator, wherein the 2-pulse gas generator comprises:
a pressure vessel provided with a combustion space therein:
a first solid propellant arranged inside the pressure vessel, wherein a first end surface of the first solid propellant is exposed to the combustion space;
a first igniter configured to ignite the first end surface of the first solid propellant:
a barrier membrane provided to cover a surface of the first solid propellant other than any combustion surface such that a combustion surface of the first solid propellant moves in a predetermined first direction as combustion of first solid propellant advances;
a position sensor device configured to detect a position of the combustion surface in the predetermined first direction; and
a processing device configured to estimate a consumption amount of the first solid propellant based on a detection result of the position of the combustion surface,
wherein the pressure vessel comprises:
a thruster section configured to exhaust out a combustion gas generated by the combustion of the first solid propellant from the pressure vessel through an area adjustable opening section; and
a pressure sensor device configured to measure a combustion pressure in the combustion space,
wherein the processing device calculates a setting value of the combustion pressure necessary to combust out the first solid propellant by a desired time based on the detection result of the position of the combustion surface and a measurement result of the combustion pressure,
wherein the 2-pulse gas generator further comprises:
a control device configured to adjust the combustion pressure based on the setting value by adjusting an area of the opening section of the thruster section;
a second solid propellant arranged inside the pressure vessel; and
a second igniter configured to ignite the second solid propellant at the desired time,
wherein the position sensor device detects the position of the combustion surface in the predetermined first direction at a timing controlled by the control device,
wherein the position sensor device is another pressure sensor device which is comprises a high response pressure sensor arranged to oppose the combustion surface across the combustion space and configured to measure the combustion pressure, and
wherein the processing device analyzes frequency components of the combustion pressure measured by the high response pressure sensor, and calculates a distance from the high response pressure sensor to the combustion surface based on a frequency component having the maximum amplitude of the frequency components, the method further comprising:
arranging the first solid propellant inside the pressure vessel and covering the surface of the first solid propellant other than any combustion surface with the barrier membrane such that the combustion surface moves in the predetermined first direction as the combustion of the first solid propellant advances;
igniting the first solid propellant by the first igniter;
detecting the position of the combustion surface in the predetermined first direction by the position sensor device; and
estimating the consumption amount of the first solid propellant based on the detection result of the position of the combustion surface by the processing device.

18. The method according to claim 17, further comprising:
exhausting out the combustion gas generated by the combustion of the first solid propellant from the pressure vessel through the area adjustable opening section of the thruster section;
measuring the combustion pressure in the combustion space by the pressure sensor;
determining the desired time at which the first solid propellant is combusted out;
calculating the setting value of the combustion pressure necessary to combust out the first solid propellant by the desired time based on the detection result of the position of the combustion surface and the measurement result of the combustion pressure by the processing device;
adjusting the combustion pressure to the setting value by the control device by adjusting the area of the opening section of the thruster section; and
igniting the second solid propellant arranged inside the pressure vessel at the desired time by the second igniter.

19. The method according to claim 18, wherein the detecting the position of the combustion surface comprises:
detecting the position of the combustion surface in the predetermined first direction at the timing controlled by the control device.

20. The method according to claim 18, wherein the detecting the position of the combustion surface comprises:
detecting that the combustion surface has reached a predetermined position in the predetermined first direction, when the combustion surface has reached the predetermined position.

* * * * *